Figure 1:
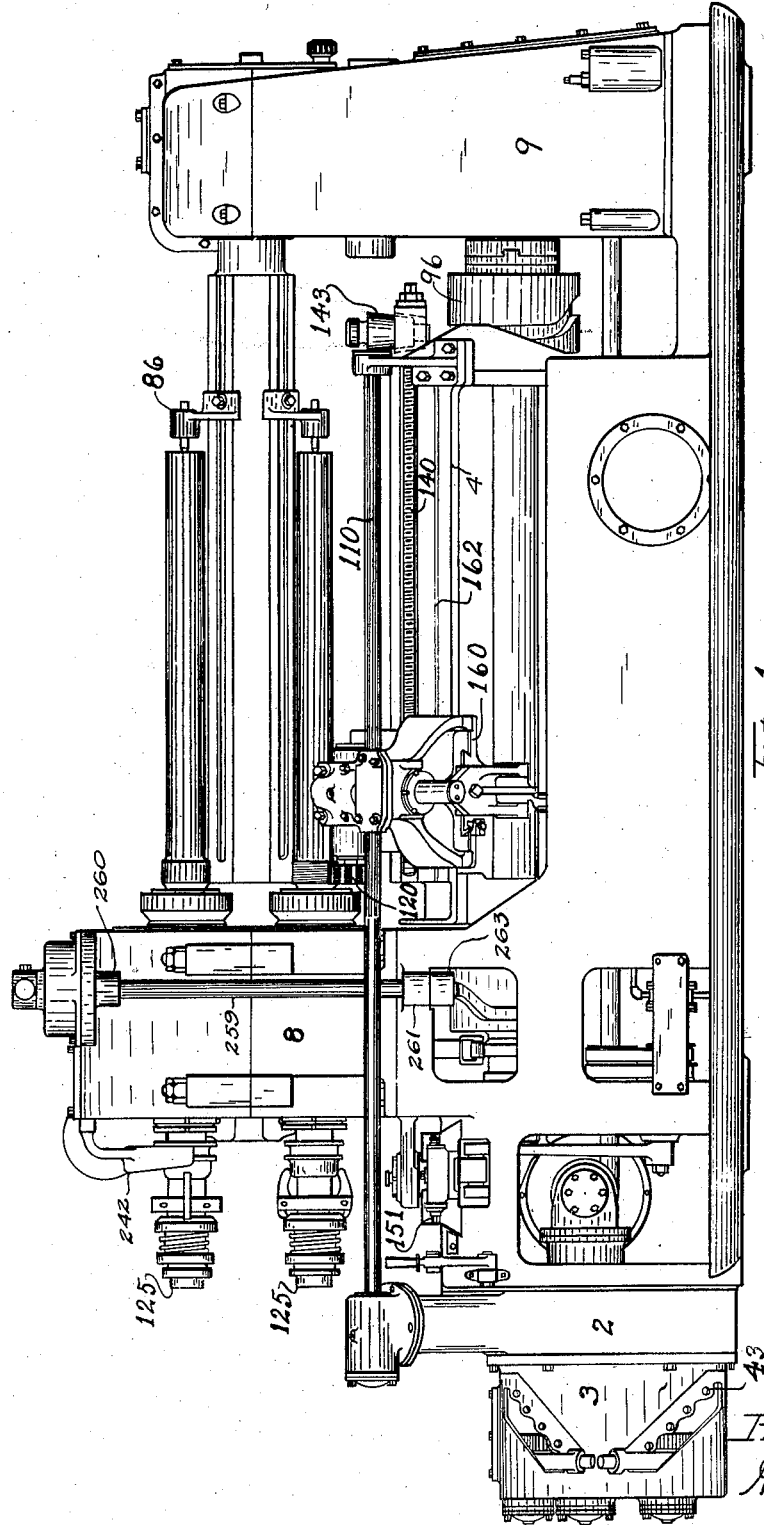

July 15, 1924.

G. T. TRUNDLE, JR 1,501,252

THREAD MILLING MACHINE

Filed July 1, 1920

13 Sheets-Sheet 3

Inventor
George T. Trundle Jr
By Bates & Macklin,
Attorneys

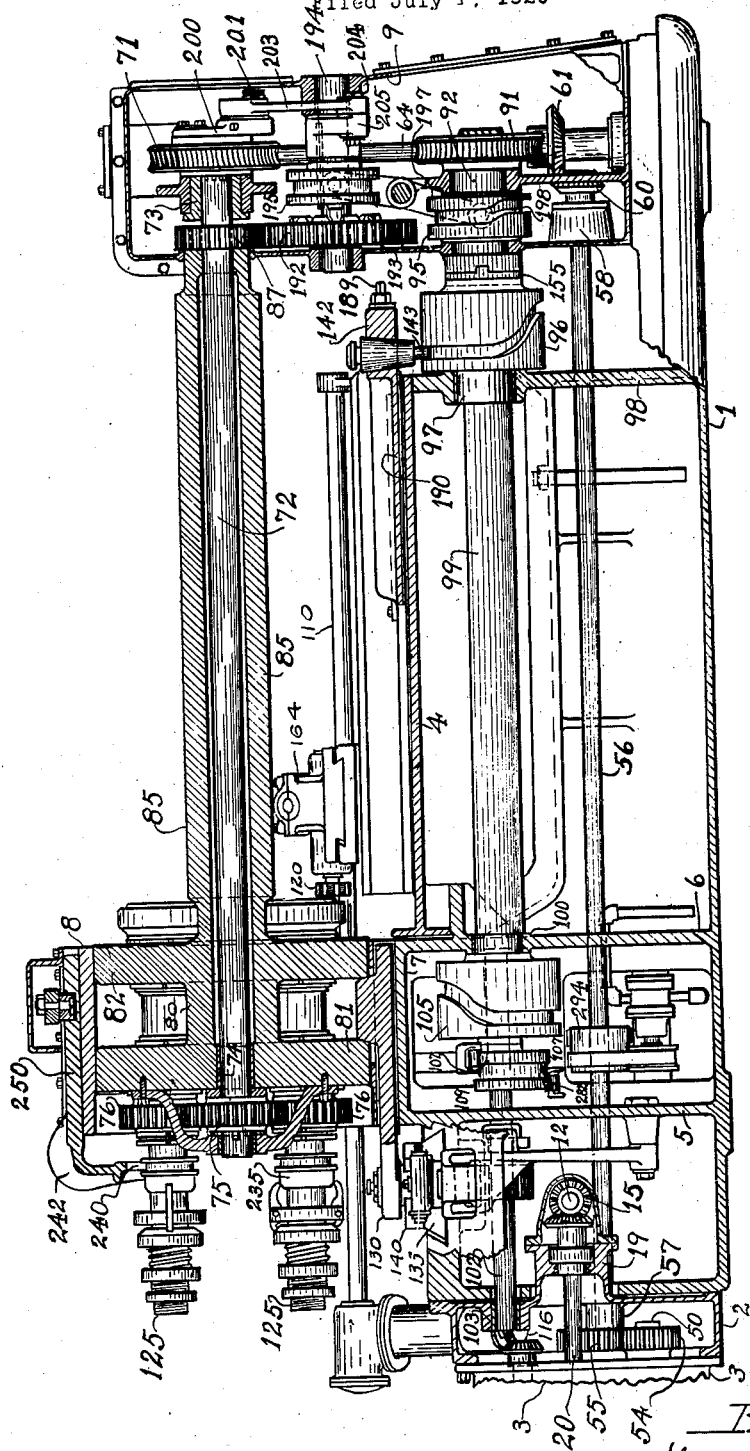

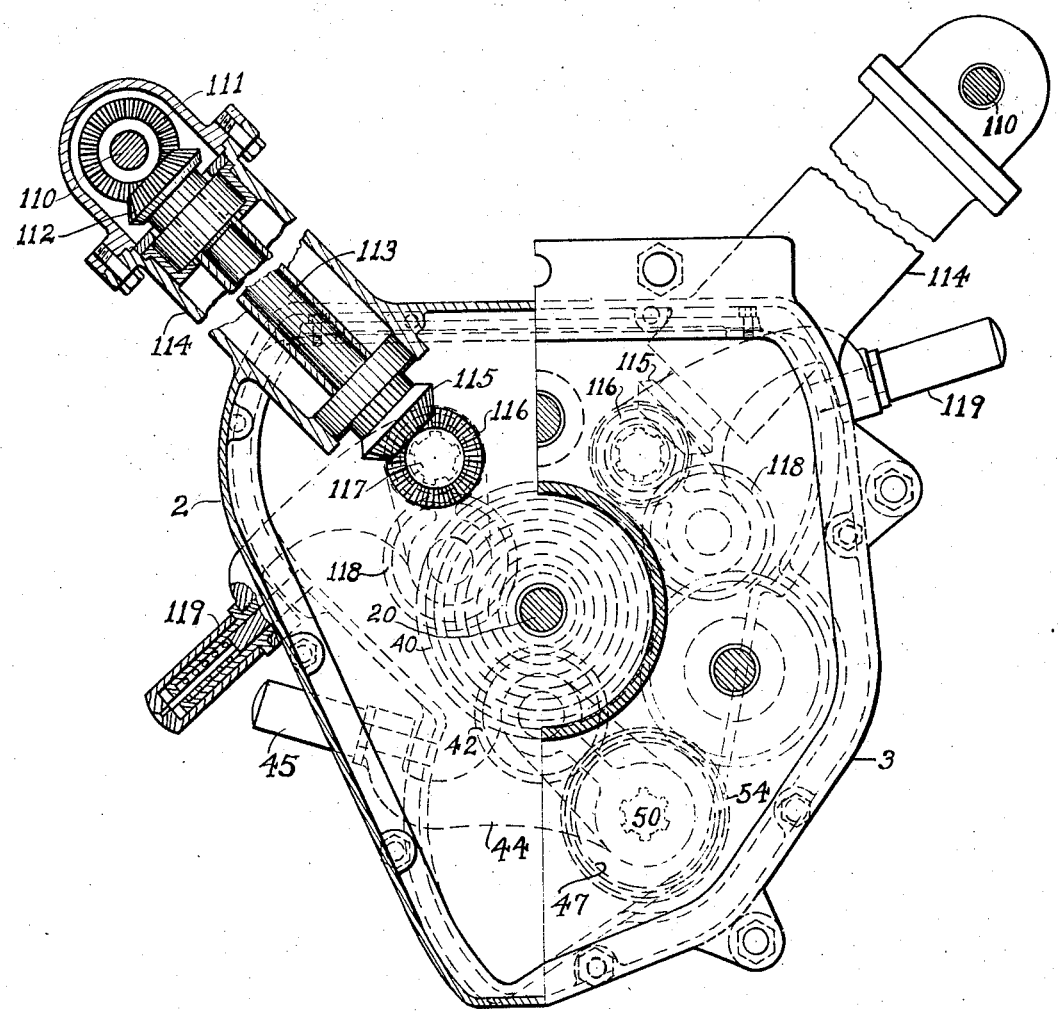

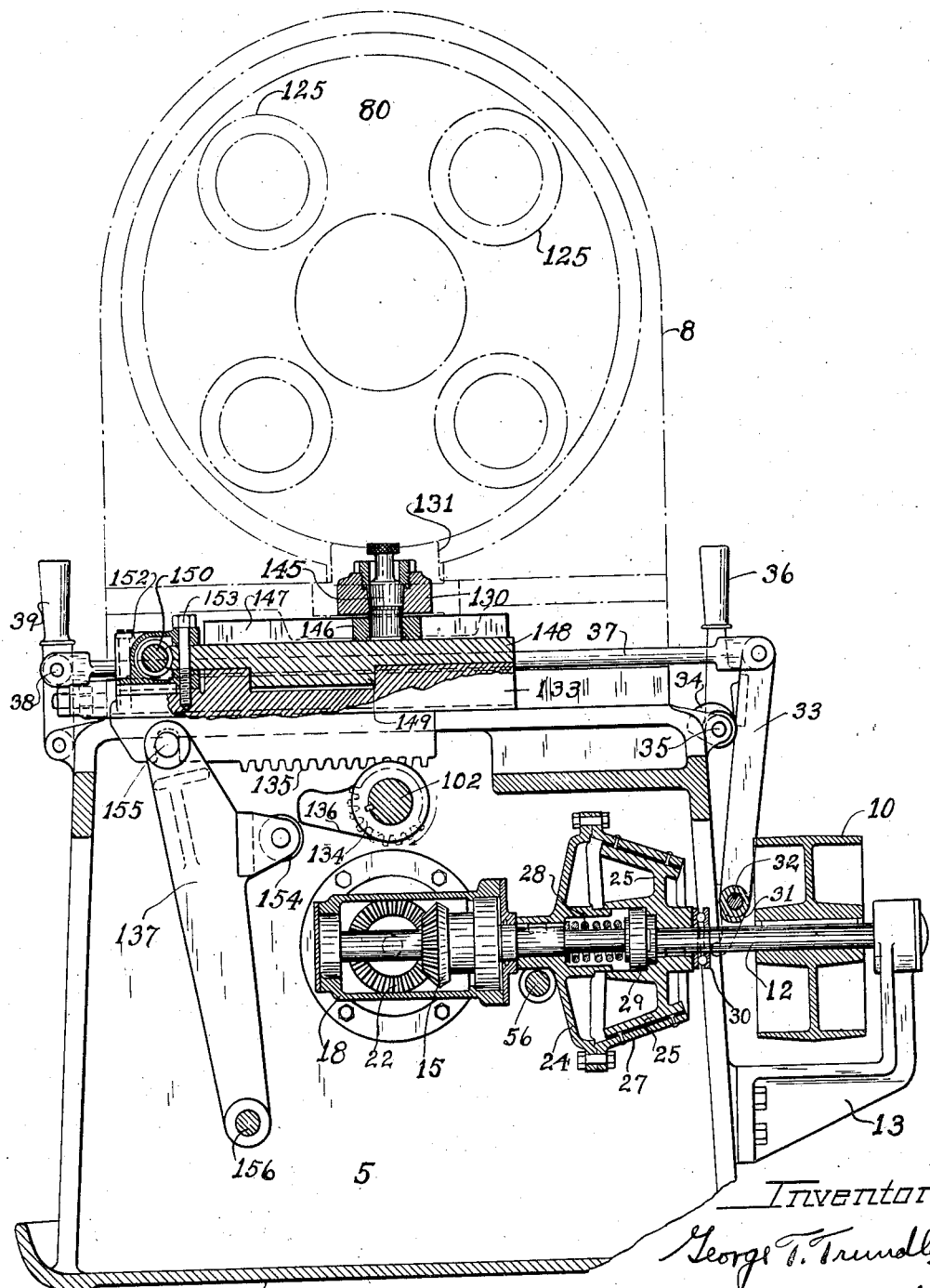

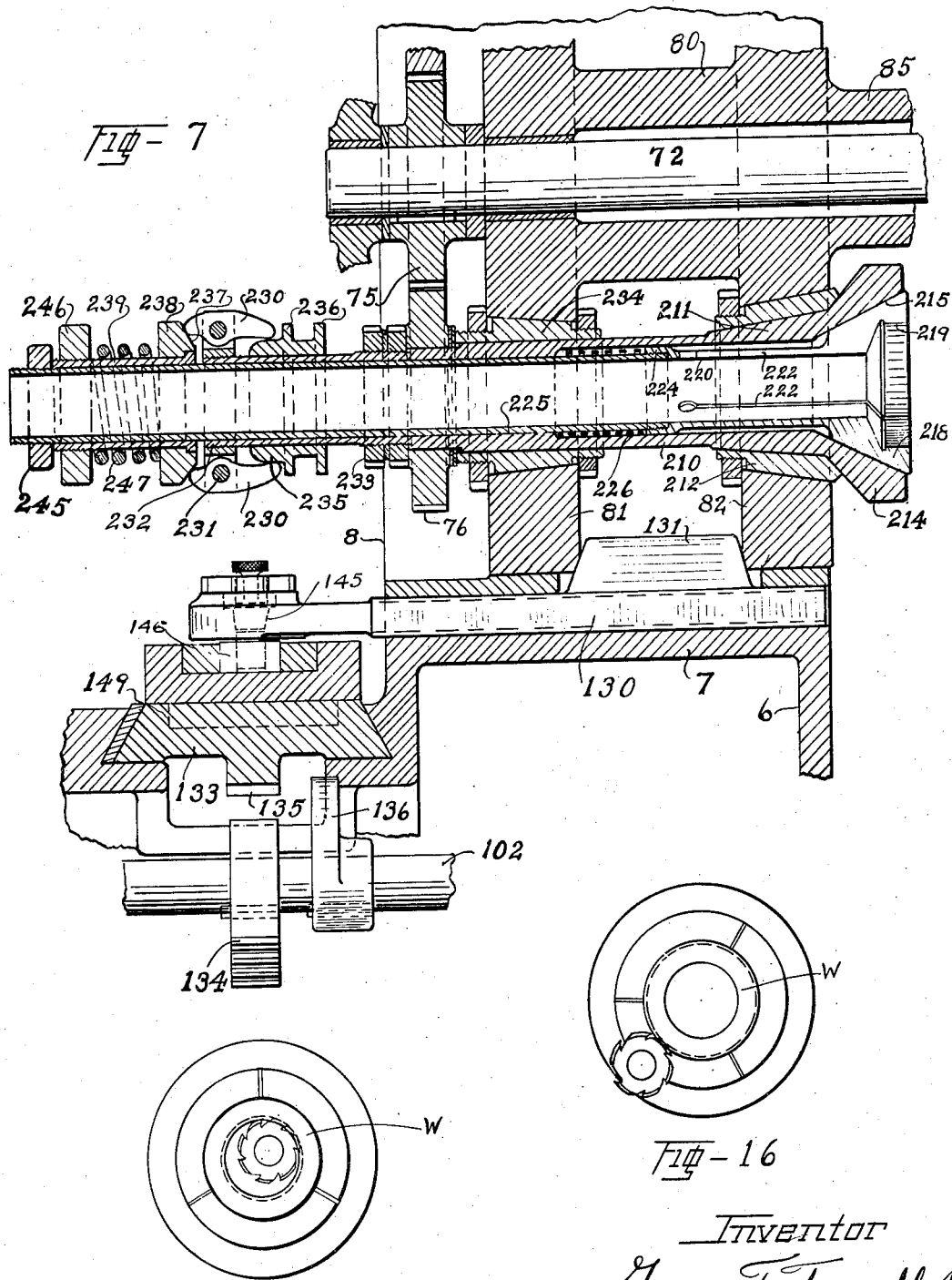

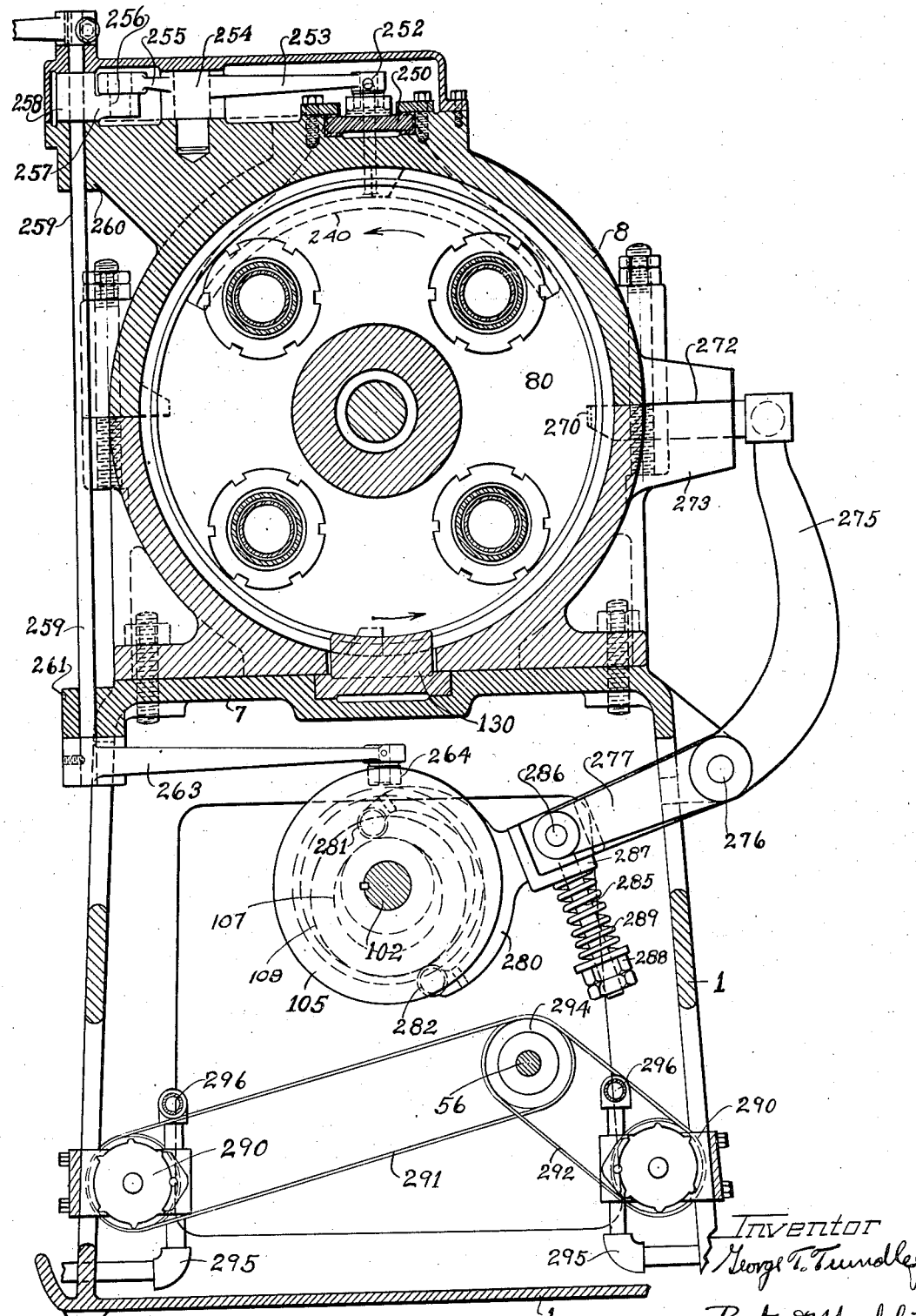

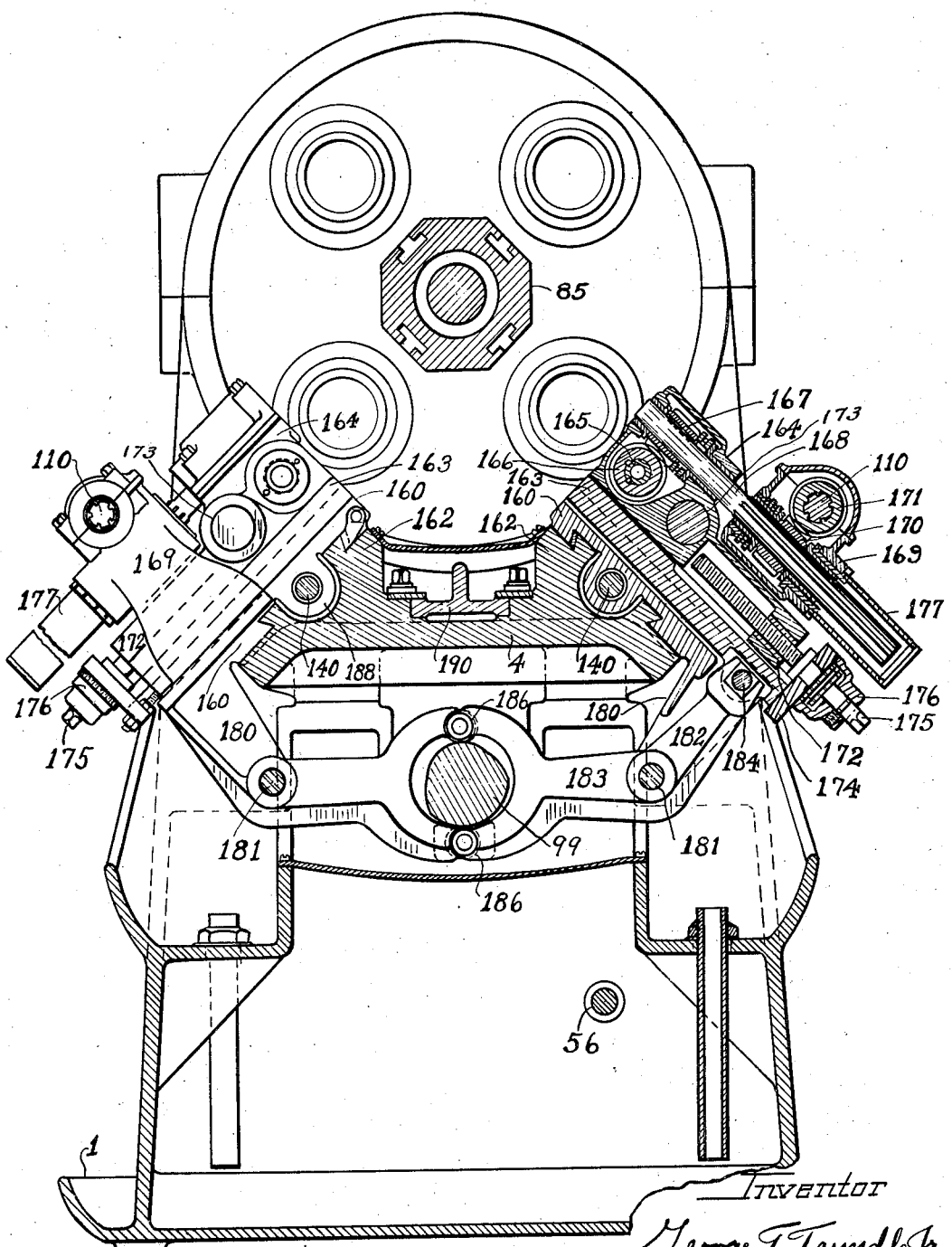

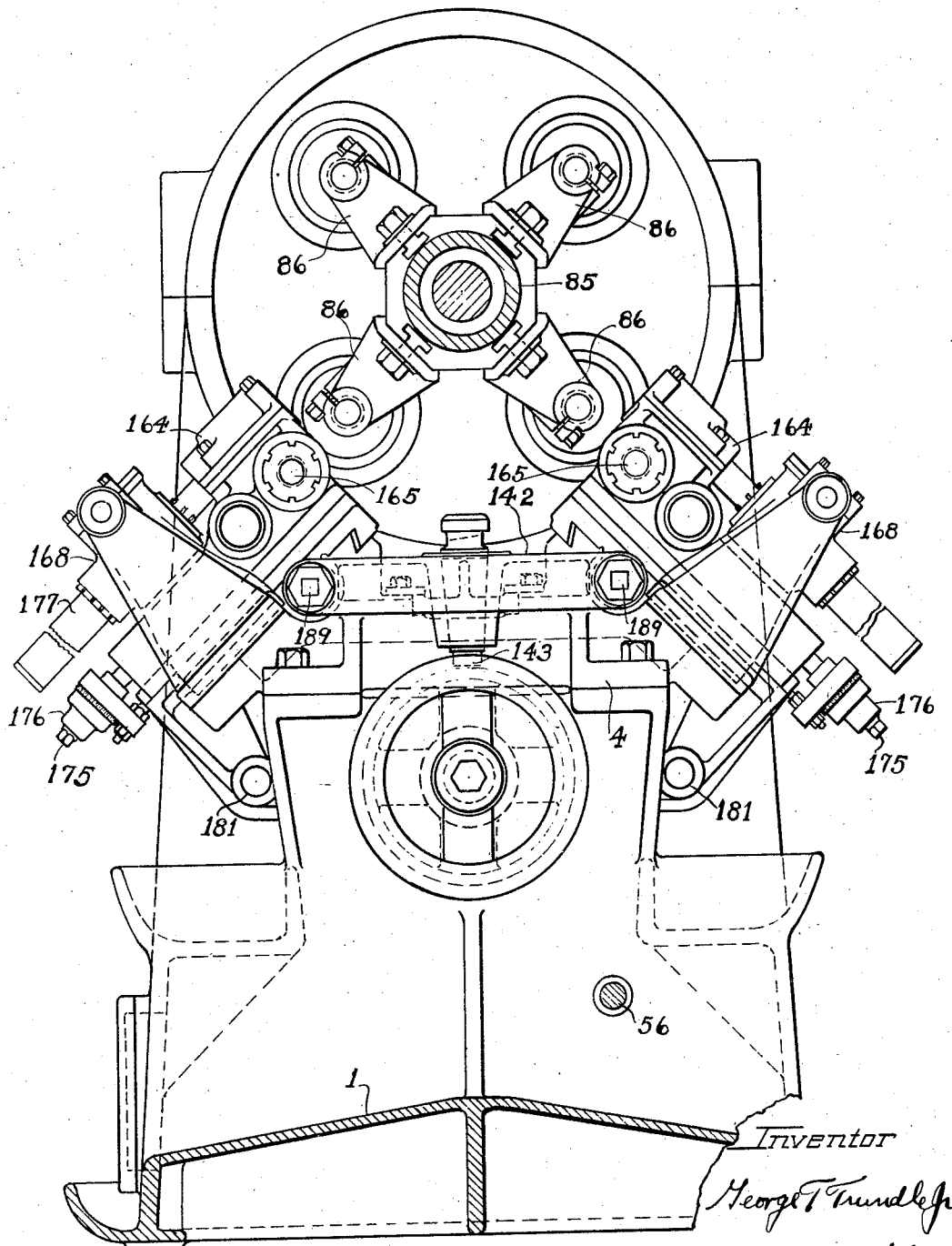

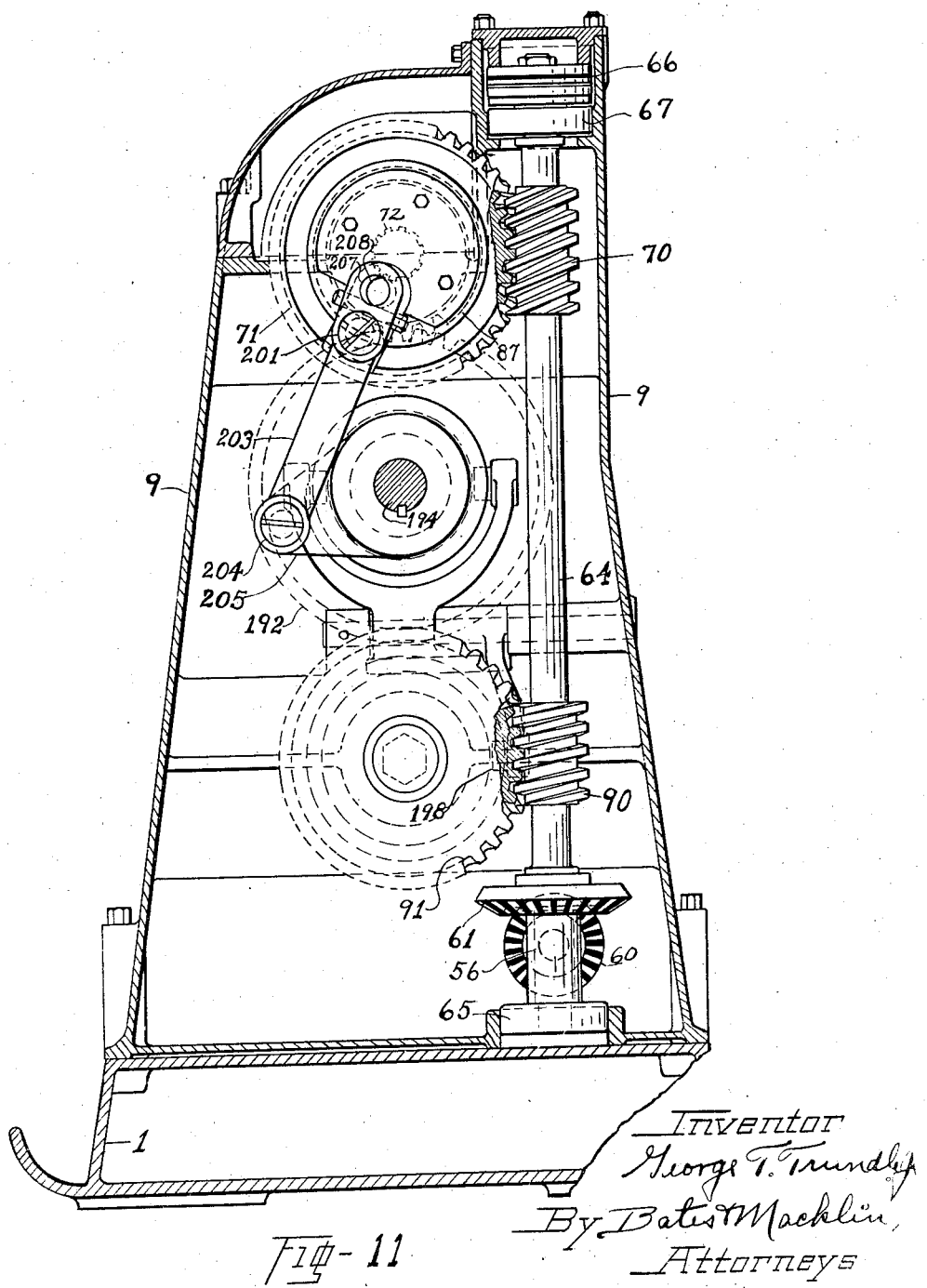

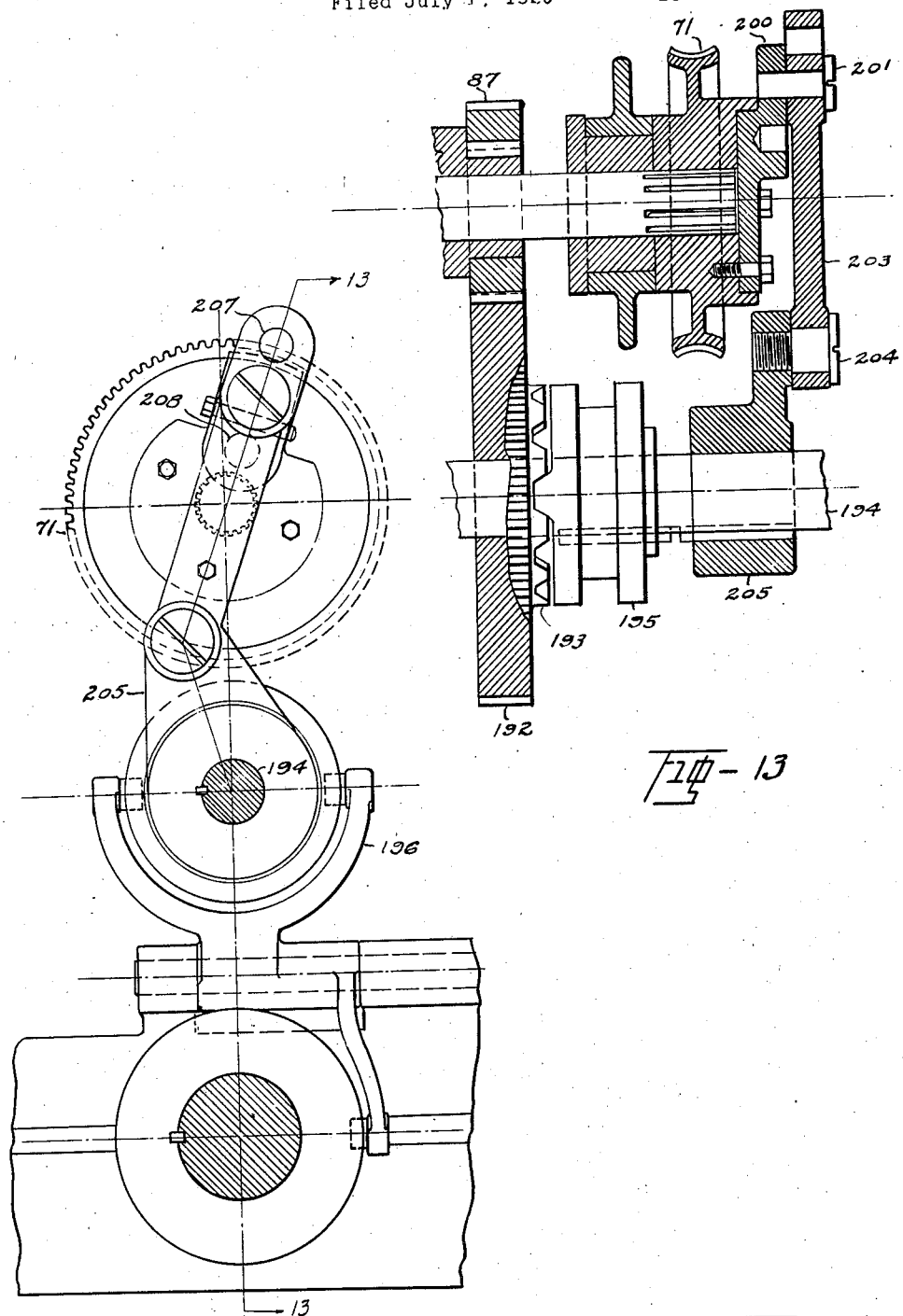

July 15, 1924.

G. T. TRUNDLE, JR 1,501,252

THREAD MILLING MACHINE

Filed July 1, 1920    13 Sheets-Sheet 13

Inventor
George T. Trundle Jr.
By Bates & Macklin
Attorneys

Patented July 15, 1924.

1,501,252

UNITED STATES PATENT OFFICE.

GEORGE T. TRUNDLE, JR., OF CLEVELAND, OHIO, ASSIGNOR, BY MESNE ASSIGNMENTS, TO PRATT & WHITNEY COMPANY, OF NEW YORK, N. Y., A CORPORATION OF NEW JERSEY.

THREAD-MILLING MACHINE.

Application filed July 1, 1920. Serial No. 393,315.

*To all whom it may concern:*

Be it known that I, GEORGE T. TRUNDLE, Jr., a citizen of the United States, residing at Cleveland, in the county of Cuyahoga and State of Ohio, have invented a certain new and useful Improvement in Thread-Milling Machines, of which the following is a full, clear, and exact description, reference being had to the accompanying drawings.

This invention relates to a machine for cutting machine screw threads on various kinds of articles by the use of multiple cutters or hobs. The general object of this invention is to provide a thread milling machine of this character which shall be capable of very accurately and rapidly forming the screw threads of a wide variety, on many different kinds of machine elements, and which shall be automatic in a large part of its operations.

More specifically the purpose of the invention includes the provision of a milling machine of this character which shall be adapted for the operating, both internally and externally, on parts carried with and rotated by a plurality of spindles, mounted in a revolvable head, the milling operation being effected by cutters automatically revolved, the work and cutters being relatively advanced correspondingly to the size and pitch of the thread to be cut. In carrying out this purpose many subordinate objects are incident to the invention, such as the provision of various adjustments and arrangements for replacement of parts, particularly as relates to the manner of holding various work pieces and the thread hobs or cutters.

Further purposes and objects of the invention are to so arrange such a machine that two or more parts may be operated upon simultaneously, or the operation on such parts may be such that internal and external milling operations may take place simultaneously on some of the spindles while others of the spindles are automatically opened and closed, to facilitate the removal of the finished piece and its replacement by a fresh piece or part to be operated upon, thus attaining maximum rapidity of operation, greatly increasing the productive capacity of the machine and reducing to a minimum the amount of time ordinarily wasted in the operation of such machines.

The machine in a preferred embodiment comprises briefly, a frame carrying suitable driving mechanism including adjustable change speed gearing, for a wide variety of speeds, capable of driving the work spindles and cutters at various relative speeds; a plurality of work spindles mounted in a revoluble head somewhat after the manner of well known types of automatic screw machines; a central driving shaft, a support carrier axially alined with said spindles and adapted to carry supports adjustable along the same for the work of various lengths; a novel mechanism for revolving the spindle head and for locking it accurately after each partial revolution, including means for causing a revolution corresponding to space between two or more spindles, depending upon the particular use being made of the machine; cutter carrying cross slides capable of adjustment toward and away from spindle axes, with means for automatically moving them longitudinally a material distance, as is necessary for internal threading; means for subsequently causing a relative advance of the cutter and work spindles corresponding to the pitch of the thread; and automatic means for feeding the cutter into the depth of the thread and withdrawing the same; automatic and manual means for operating the work holding chucks carried by the cutter spindles; and various accessories, parts and novel characteristics, all of which are hereinafter fully described in connection with the drawings which illustrate my invention.

Subordinate objects and novel characteristics will be made more apparent in the following description in connection with the various parts of the mechanism to which they relate, and the essential characteristics of the invention are hereinafter summarized in the claims.

Figure 2:
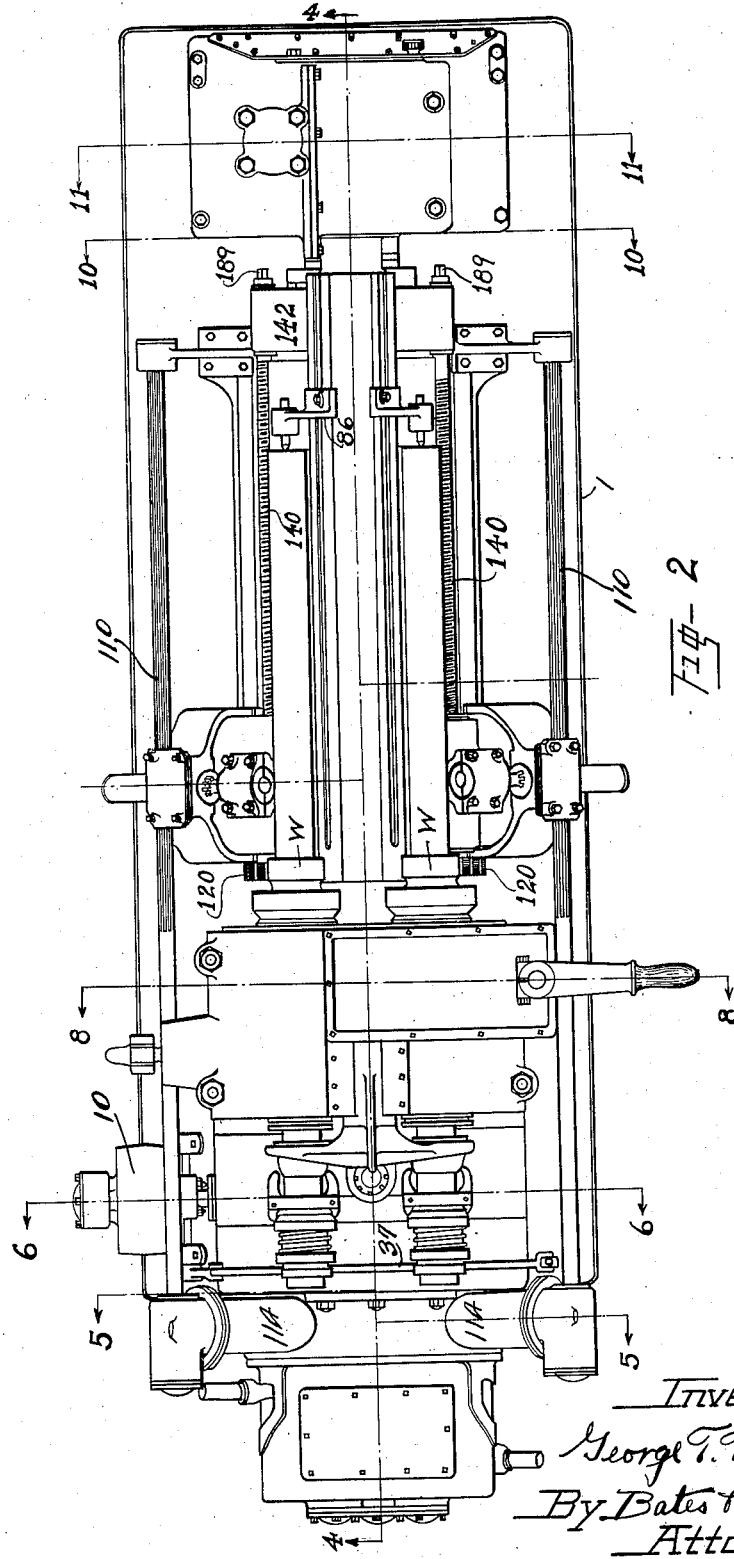
Figure 3:
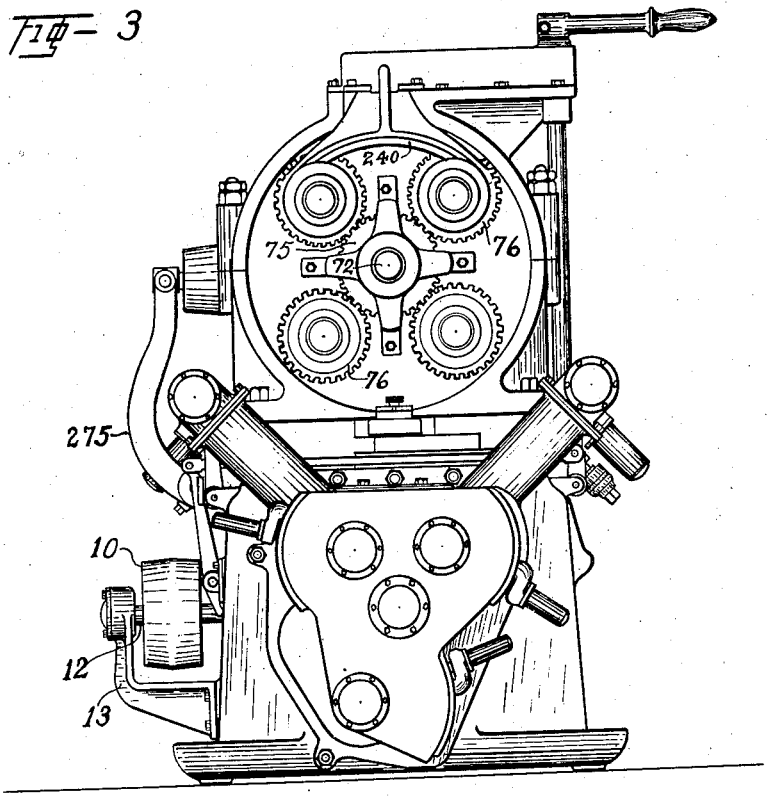
Figure 18:
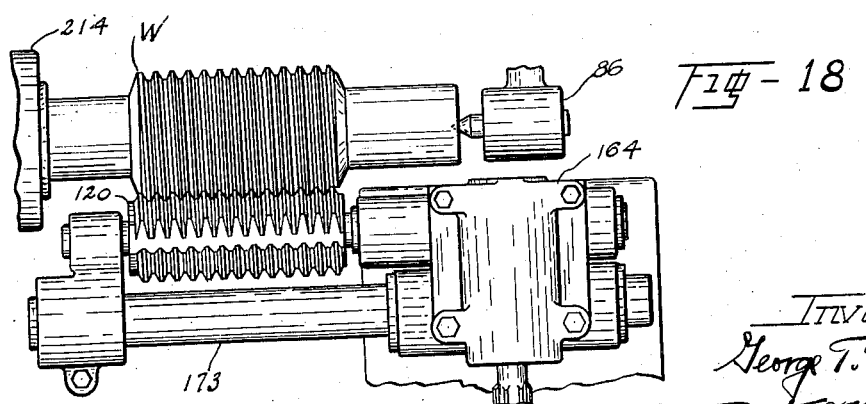
Figure 14:
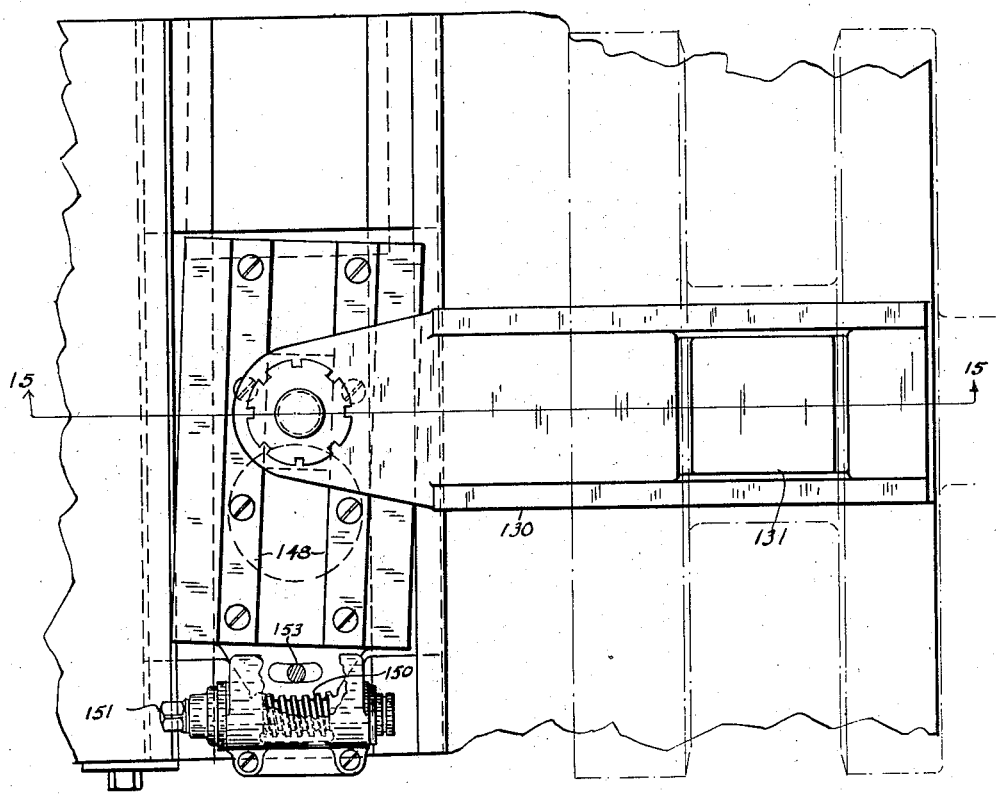
Figure 15:
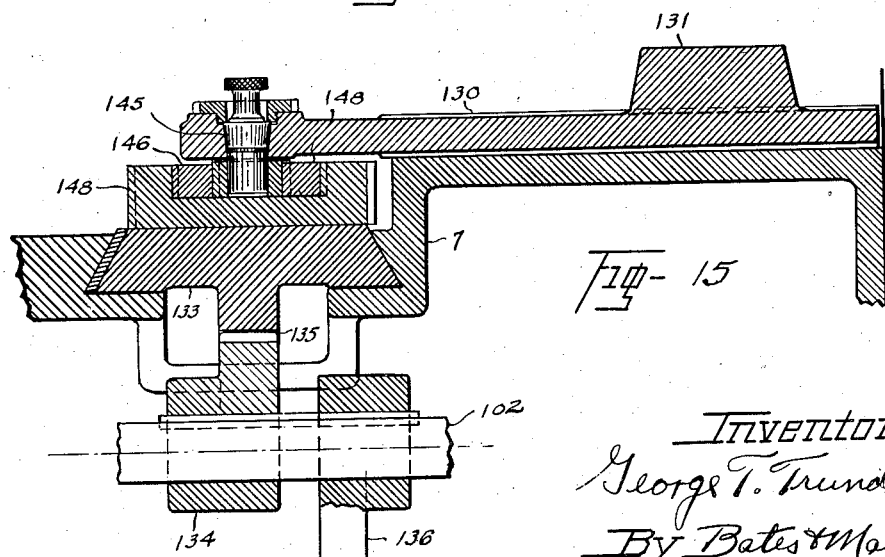

In the drawings Fig. 1, is a side elevation of the machine; Fig. 2, is a plan view of the same; Fig. 3, is an end elevation looking toward the left hand end of the machine as represented in Figs. 1 and 2; Fig. 4 is an irregular longitudinal vertical cross section showing many of the parts in elevation, the plane of the section being represented approximately by the line 4—4 of Fig. 2; Fig. 5 is an enlarged sectional end elevation showing the driving gearing and change speed regulating devices, the planes of the section being vertical transverse planes approximately on the lines 5—5 of Fig. 2; Fig. 6 is in the nature of a transverse section through the frame of the machine illustrating the main driving clutch and operating means therefor, and a slide cam mechanism for attaining the required advance corresponding to the pitch of the thread being cut; (Figs. 5 and 6 are made on a scale somewhat enlarged over the scale of Figs. 1 to 4); Fig. 7 is an enlarged section taken on a vertical plane substantially parallel with the axis of the spindle carrying head and through one of the spindles (this figure being taken on a still further enlarged scale); Fig. 8 is a vertical transverse section through the spindle carrying head and the frame of the machine, being taken substantially on a plane indicated by the line 8—8 of Fig. 2; Fig. 9 is a transverse section, on an offset plane, through the frame of the machine looking toward the spindle carrying head and showing the cutter carriers and the mechanism for driving and advancing them to and from the work; Fig. 10 is a similar view in the nature of a section through the frame of the machine taken transversely on a plane indicated by the line 10—10 of Fig. 2 and also looking toward the spindle carrying head; (Figs. 8 to 11 inclusive are drawn to approximately the same scale as Fig. 6); Fig. 11 is a vertical section through the mechanism for driving the longitudinal shafts and cams, and a mechanism for advancing by partial revolutions the spindle carrying head; Fig. 12 is an enlarged detail view of parts of the advancing mechanism showing them in different positions; Fig. 13 is a sectional view of such parts taken on an offset plane indicated by the line 13—13 of Fig. 12; Fig. 14 is an enlarged detail in plan of the cross slides for advancing the spindle head; Fig. 15 is a section taken substantially on a plane indicated by the line 15—15 of Fig. 14; Fig. 16 is a detail view showing the cutter in position milling external threads; and Fig. 17 is a similar view showing the cutter acting to mill internal threads. Fig. 18 is a view of the support for long cutters.

In the following description various characters of reference indicate like parts in the several views.

The frame of the machine comprises essentially a bed portion 1 which is in the nature of a hollow box-like structure forming, at once, a rigid bed for the machine, and an oil reservoir, and which has upwardly extending walls cast integral therewith forming supports for the various bearings and operating parts. Housings 2 and 3 carried at the left hand end of the machine (Fig. 1) serve to enclose the gears and driving mechanism. Separated supporting walls 5 and 6 rising from the bed plate, carry a transverse support 7 on which is mounted a two part housing 8 in the nature of a large circular bearing for the spindle carrying head. Carried on such upright walls is a longitudinal casting 4 serving as a guide and support for the cutter carriages. At the right hand end of the machine a separate housing 9 forms supports for the longitudinal shafts of the machine and serves to support driving gear mechanism transmitting motion to various parts as will be hereinafter described. The bed plate and the various supports and housings of the frame are preferably castings arranged to facilitate both the foundry and machine work in the manufacture of the machine, being divided into various parts, covers and sections in accordance with accepted engineering practice.

For purposes of clearness in this description the general arrangement of driving shafts and power transmitting elements will be outlined next.

*The driving mechanism.*—At 10 is indicated a belt pulley mounted on a transverse shaft 12 journaled at its outer end in an outer bearing carried on a suitable bracket 13. At its inner end this shaft carries a beveled gear 15, the inner end of the shaft is supported in separated bearings formed in a housing member 18, provided with a flange bolted to a corresponding flange, formed on an inwardly projecting bearing member 19, shown as integral with the frame part or housing 3. The bearing 19 supports a shaft 20 on the end of which is a gear 22 meshing with, and driven by a gear 15. The shaft 12 is intermediately divided, and its adjacent ends carry clutch members 24 and 25. The clutch member 25 fits inside of the converging cone shaped member 27, removably secured to a member 24 by flanges on each member which are bolted together. The member 24 has a boss integral therewith and keyed to the inner section of the shaft 12 while a spring 28 surrounding the shaft bears against a shoulder on the member 24, and a thrust bearing 29 carried by the member 25, which is splined to the outer section of the shaft 12. Outside of the hub portion of the member 25 is a thrust bearing 30 against which a yoke 31, on a rock shaft 32, may bear to slide the member 25 inwardly against the spring 28 and disengage the cones, allowing the driving pulley to run freely and permitting the machine to stop.

To operate the clutch, the yoke 31, which straddles the shaft 12, is rocked by means of a lever 33, which may be operated by a revoluble cam 34 carried on a rock shaft 35 adapted to be rotated by a hand lever 36, the cam bears against the inner face of a pad on the lever 33, and when the lever is swung outwardly to the right (Fig. 6) it moves the lever 33 correspondingly and may hold the lever in a position with the clutch disengaged, until the lever is returned manually to its upright position, permitting the spring to cause the engagement of the clutch members. The clutch may be opened or disengaged, also, by means of a link 37 pivoted to the upper end of the lever 33, and extending transversely across the machine and pivoted at 38 to a lever 39 similar to the lever 36. Thus the operator may conveniently stop the machine from either side thereof.

The shaft 20 carries a series of gears of different sizes rigidly secured thereto and indicated by the dotted lines 40. These gears may in turn be meshed with movable idler gears, such as 42, carried by swinging and longitudinally movable levers 44, having a latch handle 45, provided with the usual spring actuated pins coacting with spaced holes such as at 43 in the housing 3. The idler designated 42 is capable of engagement with any of the gears 40. It is shown in Fig. 5 in engagement with the smallest gear. It always meshes with a gear 47 having a fluted engagement with a shaft 50, whereby it may slide along the shaft and at the same time drive this shaft. The shaft 50 rigidly carries a gear 54 within the housing 2, (Fig. 4) which meshes with a gear 55 rigid with a shaft 56, extending longitudinally of the entire machine and having bearings 57 in the housing 2, and a bearing 58 in the housing 9.

At the far end of the shaft 56 is a beveled gear 60 meshing with beveled gears 61 on a vertical shaft 64, having a bearing at 65 at its lower end, and thrust and radial bearings 66 and 67 respectively at the top of the housing 9.

Near the upper end of the shaft 64 is carried a worm 70 meshing with a worm gear 71, having a fluted driving connection with a shaft 72 supported in a bearing 73 carried in the housing 9, and at its opposite end having a bearing 74 in the spindle carrying head 80. This spindle carrying head comprises in effect, a hub portion rigid with large radial disk-like members 81 and 82, surrounding and rotatable in relation to the shaft 72 and having their peripheries fitted in large bearing surfaces in the housing 8. Projecting forwardly from the spindle carrying head, is an integral tubular member 85 in the nature of a support for centering heads, such as indicated at 86, (Fig. 1). Within the housing 9 is an intermittent driving mechanism acting on a gear 87 rigidly mounted on the end of the support member 85 to revolve the spindle carrying head, as will be hereinafter more fully described.

Near the lower end of the shaft 64 is a worm 90, meshing with a worm gear 91, rigid on a short shaft 92, having bearings in the inner wall of the housing and in an intermediate wall. Between these bearings is provided a grooved cam 95 for actuating the intermittent driving mechanism for advancing the spindle head. Aligned with and driven by the stub shaft 92 is a specially constructed cam shaft (Fig. 4) comprising a section carrying a grooved cam 96, and having a bearing at 97 in a wall 98 rising from a bed plate, and an intermediate section 99 of special cross sectional contour, forming a cam extending longitudinally for a considerable distance and arranged to operate the cutter carriages at any point of its length, and also having a bearing portion 100 in a bearing formed in the wall 6 of the bed plate. Beyond the bearing 100 and to the left, (Fig. 4) the shaft extends in a reduced size again concentric with its own axis and designated 102, and having a bearing at 103 in the housing member 3, while on this reduced portion is carried a grooved cam 105 acting through certain mechanism to automatically open and close the chucks of the spindles. Adjacent cam 105 is a pair of face cams 107 and 109. These cams serve to operate a locking device hereinafter described for the spindle head.

Rising from the housing 2 and extending outwardly are housing arms supporting shafts connecting gearing and bearings for driving shafts 110, extending longitudinally one at each side of the machine and fluted, as shown, to provide a sliding engagement for actuating the mechanism driving cutters indicated at 120 (Figs. 1 and 2) and shown as operating on work indicated at "W." The shafts 110 carry on the left hand end bevel gears 111, driven by bevel gears 112, on shafts 113 which have suitable bearings in housing arms, as designated 114 and shown as integral with the housing member 2. (Fig. 5.) At the inner ends of the shafts 113 are beveled gears 115, driven by gears 116, on the ends of shafts 117, each of which carries a gear fluted thereto and driven by an idler gear 118, each in turn carried by a rocking lever bracket having positioning hand-operated latches indicated at 119, whereby these gears may be driven at various speeds, independently of the position of the gears 42 driving the main shaft 50.

The spindles are carried by bearings positioned in the disks 80 and the spindles as a whole are designated 125. They are positioned with their axes parallel with the axis of the spindle head and the shaft 72 whereby they may be driven in unison and at the same speed by a central gear 75 meshing with the outer gears 76 (Figs. 3, 4 and 7) rigid with each of the spindles.

The longitudinal movement of the spindle head and spindles is accomplished by means of a slide 130 having an upwardly projecting boss 131, in slidable engagement with smooth beveled surfaces on the inner sides of the disks 81 and 82, whereby longitudinal movement of this slide may correspondingly shift the spindle head. This shifting is accomplished by a slide approximately at right angles to the slide 130 (Figs. 6, 7, 14 and 15) and designated 133 and adjustably connected to the slide 130, to vary the distance which the spindles may be moved consequent upon the transverse movement of the slide 133, which is caused by a segmental gear 134 on shaft 102, engaging a rack 135 on the slide 133. This slide is moved in the opposite direction by a cam 136 acting on a lever 137 connected with the slide. The detailed construction of this mechanism and its operation will be hereinafter described.

For the purpose of cutting internal threads it is necessary to move the cutter carriers longitudinally with relation to the spindle head a considerable distance, to thrust the cutter into and out of the work, to cutting position and outwardly away from the work. Accordingly I have shown screws 140 adapted to accomplish the adjusting of the longitudinal position of the cutter carrying slides. These screws are rotatably connected with a cross head 142, carrying a projecting pin 143, engaging the groove in the cam 96, whereby simultaneous longitudinal movement of the cutters toward and away from the spindle head is effected.

In order that the operation of my machine may be more readily understood, it is believed desirable at this point, to give a brief description of the method of operation of the machine.

Assume that the work "W" is suitably embraced at one end by the chucks of the spindle, and centered at the other end by the supports 86, and that the proper cutters 120 have been selected and positioned in the cutter carriers the clutch is now rendered active which results in the following cycle of operations. Both of the cutters are fed into the proper cutting depth, while the spindles are being rotated through the driving gearing 75 and 76, and central shaft 72 is in turn rotated by the worm and gear connection with the shaft 64, which is driven by the shaft 56, rotated at the speed selected at the change gear mechanism. At the same time the entire spindle carrying head, the work and supports 85 with the center supports 86 are moved longitudinally with relation to the cutters, by the slide 130 and its actuating across slide 133, moved in one direction by the gear 136. The cutters, as stated, are brought to the proper depth of cut, by the long shaft-like cam 99 acting on suitable levers, connecting the cam 99 with the carrier slides (as shown in Fig. 9 and to be hereinafter described).

The cutters themselves are revolved through driving mechanism in the carrier slides, actuated by the fluted shafts 110, which are driven at a previously selected speed through the change gear mechanism heretofore described. This operation continues through more than a complete revolution of the spindles, thus completing the thread to be cut, whereupon the cutters are withdrawn from the work and the spindle carrying head is revolved one-half of a revolution, bringing the two opposite spindles to the corresponding cutters, with work previously set up in their chucks and supports. The spindle carrying head is locked in this new position and the cam 105 then acts through mechanism to be described to withdraw the spindle chuck locking sleeves, allowing the removal of the finished work and the positioning of fresh pieces, which upon the continued movement of the cam 105 are gripped by the spindle chucks. This takes place during the cutting on the two opposite spindles. Consequent upon the completion of the cutting operation the cutters are again withdrawn and the spindle head revolved to again bring fresh work to the cutters.

For the purpose of internal thread milling, the cutters are moved inwardly bringing their spindles approximately to the axes of the corresponding work carrying spindles, the work is secured in the chucks as before, and the cutters are moved into the interior of the work, that is longitudinally of the cutter spindles, by the cam 96 acting on the follower pin 143, and cross head and screws 140 as described, after which the cutters are forced into the work during the revolving of the spindles and the relative pitch advance is caused by shifting of the spindle head as before. After the completing of more than one revolution, making a finished thread, it is necessary to withdraw the cutters by a two-way movement, that is toward the axis of the spindle, out of engagement with the threads, and then longitudinally of the spindle out of the work. These two movements take place in succession through the cams 99 and 96.

Various adjustments are provided for in the mounting of the cutters and in the methods of holding short pieces of work for internal or external milling, or long pieces supported at their free ends by the support 85 and center supports 86. The relative advance corresponding to the pitch of the thread is provided for by adjustment. The cutting to the correct depth of the thread is also provided for by mechanism associated with the cutter carriers. When desired the spindle head may be advanced a space of the distance from one spindle to the next by a provision in the mechanism for indexing or advancing the head. All of the above is hereinafter taken up and described in detail.

*The change speed gearing.*—The change speed gearing is preferably of such standard or well known construction that no further description is required, except to call attention to the advantages of the general arrangement selected. As will be seen from Figs. 1, 3 and 5, the shafts 117 and their connections to the shafts 110 may be driven at different speeds, but for ordinary purposes of operation where the machine is milling the threads on parts of the same character, the shafts 110 are driven at the same speed in order that each cutter may rotate at the same speed. It will also be apparent that the cutter speed may be varied at will with relation to the speed of rotation of the cutter spindles and the work, which of course is very much slower. The driving action is transmitted through the gears 42 and 47, (speed being selected by positioning of the gear, 42) through the gears 54 and 55 to the shaft 56, gears 60 and 61 to the shaft 64, and thence through the worm and worm-gear 70 and 71, shaft 72 and gears 75 and 76, to revolve the spindle somewhat more than one revolution (preferably two revolutions) while the cutters, of course, make a large number of revolutions, so that the milling of threads may be accomplished smoothly and effectively.

*Mechanism for advancing the spindle head corresponding to pitch of thread.*—The means for accomplishing the relative advancing of the cutter spindle and work spindles, heretofore referred to, is shown particularly in Figs. 4, 6, 7, 8, 14 and 15, and the particular arrangement of this mechanism which I have found successful may be described in detail as follows:—

The slide 130 with its boss 131 has arcuate beveled surfaces fitting between corresponding beveled surfaces at the inner edges near the periphery of the spindle carrying disks 81 and 82. This slide is mounted in suitable ways formed above the support 7, shown as cast integral with the vertical supports 5 and 6 of the bed frame, and these ways extend parallel with the axes of the spindle and spindle head. The slide projects outwardly from the ways over the slide 133, and here carries a downwardly projecting pin 145, secured in place by a hollow nut threaded into the end of the extension of the slide. The lower end of this pin is losely fitted into a cylindrical opening in a block 146, adapted to slide between parallel guideways 147, rigidly supported on a turn-table plate 148, having a circular boss 149 fitting a corresponding cavity formed in the slide 133. Thus this plate may swing a short distance in each direction about the axis of this boss, so that the ways 147 may be set at a slight angle with relation to the ways of the slide 133, (Fig. 14) whereby a longitudinal movement of this slide may effect a cam action on the block 146, transmitting a longitudinal movement to the slide 130 and to the spindle carrying head.

To accomplish the adjustment to vary the movement of the spindle head I provide at one end of the turn plate 148, teeth engaged by a screw or worm 150, mounted in a suitable housing and having an angular stud 151 at one end, by which the screw may be turned accurately to change the angle between the guides 147 and the ways for the slide 133. The housing, designated 152, for this worm 150, is shown as secured by suitable screws, one of which extends through an arcuate slot in the plate 148, which slot permits the swinging movement of this plate and at the same time establishes limits therefor.

As previously stated reciprocating movement of the slide 133 is caused by a segmental gear 134 and a cam 136, the gear acting intermittently on a rack 135 (Fig. 6) for the operating of the slide 133, while the cam 136 is provided with a surface engaged by a roller 154 carried by the lever 137, to quickly return the slide. This lever is shown as pivoted at 155' to the slide 133, and also pivoted at its lower end 156 to the framewall 5. As the shaft 102 rotates in the direction of the arrow Fig. 6, the teeth of the segmental gear 134 engage the teeth of the rack 135 and advance the slide 133 accurately at an even speed with relation to the cutting operations which is taking place, moving the slide 133 to the right, as seen in Fig. 6 and correspondingly moving the spindle head with relation to the cutter to accomplish the proper advance for the pitch of the thread. The spindle head movement may be in either direction, depending upon whether the thread being cut is right or left hand spiral, and governed by adjusting and swinging slide plate 148. This continues until this advance exceeds the pitch of the thread, that is, through more than a complete revolution of the spindle and work being acted upon by the cutter, and until the gear 134 comes out of engagement with the rack 135, at which time the cam 136 engages the roller 154 and starts the quick return movement, the cutter having been withdrawn from the work by the cam 99.

*Mechanism for advancing and withdrawing cutter carriages.*—The cam 99, as stated, forms a part of the shaft carrying the cam and gear for actuating the cross slides to move the spindle carrying head, and serves to move the cutters toward and away from the work in synchronism with the movement of spindles and work. This composite shaft, of which the cam 99 is a part, is shown as driven by the short shaft 92, receiving its motion from the worm 90, and worm gear 91 through a coupling indicated at 155. The purpose of this coupling is to provide an accurate driving connection, while at the same time avoiding any difficulties occurring by reason of inaccuracies of alignment of the sections of this cam shaft, such as might occur in the assembling of this machine and the mounting of the housing 9 on the bed plate, which mounting is preferably adjusted particularly with reference to the upper shaft 72 and carrier 85.

The relationship of the teeth and pitch of the worms and worm gears 70 and 71, and 90 and 91 is such that the shaft 72 has two revolutions to one revolution of the cam 99, and it may be stated at this point that the central gear 75 being slightly larger than its surrounding gear 76, causes somewhat more than two complete revolutions of each of the spindles to one revolution of the cam 99. This provides for the cutter being fed into the work, to its proper depth and maintaining that depth while cutting the thread, for more than a complete revolution, and then withdrawing from the completed thread so that the cutter is freed during the subsequent longitudinal movement of the work. This movement is the quick return caused by the cross slides actuated by the cam 136, moving with the cam 99. It will be seen that these movements occur in the following order; indexing of the spindle head, moving the cutter into the work as the spindle is revolved, maintaining the cutter in this position for more than a complete revolution, drawing the cutter out of the work as the spindle continues to revolve, and maintaining it in its withdrawn position while the spindles are moved longitudinally and again indexed or revolved to present fresh work to the cutters, which are thereupon moved inwardly as before.

*The cutter supporting and operating mechanism.*—The cutter carriage comprises essentially slides 160 mounted on guideways 162 extending longitudinally of the machine and formed on the member 4. These slides 160 have transverse ways for receiving carriage slides 163, and allowing the carriages to move toward and recede from the spindles, in a path at 45° to the vertical plane of the machine. Mounted on each slide 163, is a housing 164 having bearings for the cutter spindle designated 165, on which is carried a spiral gear 166, driven by a spiral gear 167, rigid on shafts 168. This shaft has bearings in the housing 164 and extends outwardly from said housing through bearings carried in a cylindrical housing member 169, shown as integral with supporting arms or brackets, rising from and integral with the longitudinal slides 160. Between the bearings in the housing 169 I have shown a spiral gear 170 meshing with a spiral gear 171, having teeth engaging the flutes of the shaft 110, whereby the gears 171 may slide along the shaft and transmit motion to the gears 170, which, in turn, have fluted engagement with the shaft 168, allowing a relative movement with its shaft 170, and at the same time transmitting motion through its gear 166 and 167 to the cutter spindles.

At 173 is shown a cylindrical support carried in the housing 164 and on which may be mounted center or bearing supports (Fig. 18) for engaging the outer ends of the cutters when this may be desirable.

The housings 164 are slidably mounted in suitable ways, parallel with the ways engaged by the slides 163 and formed on the upper side of each slide 163, whereby the cutter spindles may be adjusted radially with relation to the axis of the spindle head. The fluted engagement of the shaft 168 and gear 170 provide for driving the cutter regardless of its position within the limits of its movement.

To provide for this cutter adjustment which must be very accurate I have shown an outwardly extending member, rigid with the cutter spindle housing 164 and carrying a nut at 172, engaged by a screw extending outwardly through a bearing 174 rigid with the plate 163, and having an angular extension at 175 by which the screw may be conveniently rotated. Mounted on the extension of the screw is shown a cap 176 which may be graduated on the exterior to facilitate accurate adjustment of the position of the cutter.

The parts of the cutter carriage and driving mechanism therefor are all arranged so as to be closed and protected by the housings and their cap members, which in several instances form portions of the bearings as is apparent from the drawings (Figs. 9 and 10). To protect the outwardly extending ends of the shafts 168 they may be inclosed by a tubular hood indicated as at 177.

Extending downwardly and inwardly from each slide plate 160 is a bracket arm 180, carrying at its lower end a pivot pin 181 for a lever which serves to feed the cutters by moving the cutter carriages toward and away from the work. These levers are shown as comprising integral arms 182 and 183 extending each way from a hub, embracing the pivot pins. The arms 182 may be bifurcated at their upper ends to receive square blocks each embracing a pin indicated at 184, the ends of which pin engage suitable ears rigid with the plate 163. The inner ends of the lever arms 183 are bifurcated to embrace the shaft-like cam 99. Each arm carries rollers indicated at 186 embracing opposite sides, that is, the upper and lower side, of this cam whereby the rotation of this cam may rock the levers and move the slides 163 with the cutters toward and away from the work. The surfaces of the cam 99, as stated, are uniform in their longitudinal extent, whereby as the slides 160 are moved along the longitudinal ways, parallel with the axis of the shaft, and with the axis of the spindle head, the lever movement may take place at any such position given the cutter carriages. The surfaces are so arranged in contour that with the rollers and levers arranged as shown the cutters may first be moved to and into engagement with the work and then by rest surfaces, that is, concentric surfaces, may be held in this position accurately during more than a complete revolution of the spindles, while the work is being operated upon, and then another surface of the cam acting upon the rollers may cause the levers to move the rollers simultaneously outwardly from the work after the cutting of the threads is finished.

The moving of the cutter carriages along the guide ways 162 to bring the cutters accurately to any desired position corresponding to the work to be operated upon, is accurately effected by means of the screws 140, which extend through downwardly projecting bosses 188, threaded to receive these screws, as is apparent in Fig. 9. The rotation of screws is rendered convenient by the angular portions 189 at the outer side of the cross head 142. This cross head 142 is shown as carried on a slide 190 (Figs. 4, 9 and 10), the ways for the slide being formed in the frame member 4 which is shown as integral with the guide ways 162. The purpose of the slide 190 is to support the cross head 142 rigidly against the various strains brought to bear thereon by reason of the engagement of the pin 143, carried thereby, with a groove of the cam 96, which cam accordingly delivers longitudinal motion parallel with the guides 162 and the screws 140. The connection between the carriages and the cam 96 may be rendered active or inactive as desired, for the purpose of causing cutters to act on internal surfaces or external surfaces as the case may be. The inactive position being indicated in Fig. 1 where the pin 143 is shown as drawn upwardly out of engagement with the cam 96. The groove is so arranged than it may cause a comparatively quick outward movement of the cutter, that is the cutter carriages may be moved quickly away from the work and returned, and during the remaining portion of the cycle of the cam may be held accurately in one position while the cutting of the threads is taking place.

*Mechanism for intermittently revolving the spindle head.*—The cam 95 on the shaft 92, which drives the cam shaft governing the motion of the cutter spindles as just described, may govern the mechanism for revolving the spindle head through mechanism, shown particularly in Figs. 4, 11, 12, and 13. On the end of the tubular support 85, which as stated is integral with the disks 80 and 81 forming the spindle carrying head, the gear 87 is rigidly mounted, and is adapted to be driven by a gear 192 meshing therewith and preferably twice the size of the gear 86. The gear 192 is mounted on a shaft 194, having bearings in the walls of the housing 9, and splined to this shaft is a clutch member 195 embraced by a yoke, permitting the rotation of the clutch member while causing its longitudinal movement through a lever 197, carrying the yoke and also having an arm carrying a roller 198 engaging the cam slot of the cam 95. Secured to the outer face of the worm gear 71 is a disk-like member 200, having a crank pin 201, embraced by the end of a connecting rod 203, the other end of which embraces a pin, at 204, in turn carried by a rock arm 205 integral with a suitable hub keyed to the shaft 194.

The arrangement of the crank pin 201, connecting rod 203 and rock arm 205 is such that as the worm gear 71 rotates, the rock arm 205 and shaft 194 are continuously oscillated. With the parts in the position shown in Fig. 11 the oscillation of the shaft 194 and its rock arm is through an arc of 90°, which transmits a motion whereby clutch teeth on the side of the clutch member 195 may engage clutch teeth 193, on the side of the gear 192, in one position, and cause a corresponding rotation of the gear 192 through an arc of 90° at the end of which movement the cam 95, acting on the lever 197, withdraws the clutch. A comparison of Figs. 11 and 12 will make this advance apparent. This movement can only take place when locking mechanism, to be hereinafter described, is released permitting the spindle carrying head to rotate one-half of one revolution or 180° at the end of which movement it is again locked. During the period of operation of the cutters the cam 95 holds the clutch member 195 free from the clutch teeth 193 throughout a complete revolution, and causes this engagement on a part of a second revolution for again advancing the spindle head.

The connecting rod 203 is provided with an additional opening 207 adapted to be brought into registration with a corresponding opening 208 in the disk 200 so that the pin 201 may be removed and placed in these openings, thus causing the pin to revolve in a circle of one half the diameter of that of its previous path. This causes the oscillation of the shaft 194, through the rock arm 205, thus oscillating the clutch 195 correspondingly so that when the cam 95 acts to cause the engagement of this clutch with the gear 192, this clutch may cause a movement of this gear in one direction, equivalent to the distance of an arc of 45°, at the end of which time the clutch is disengaged. The size of the gear 192, being twice that of the gear 87 the movement of this gear, support 85, and spindle carrying head, is through one quarter of a revolution or 90°. As this mechanism for indexing the spindle head is one of the essential characteristics to the successful operation of the machine it is considered advisable to describe its operation fully at this point.

Assume that shafts 56 and 64 are being driven, in the usual operation of the machine, the worm 70 will drive the worm gear 71 at a speed twice that at which the worm 90 drives the worm gear 91, resulting in a corresponding speed of rotation of the spindle driving shaft 72 and the cam shaft including the cams 95, 96 and 99, etc. Upon the completion of the milling operation and the withdrawal of the cutter from the work, under the influence of the cam 99, the cam 95 acts through the lever and yoke members 196, to actuate the clutch 195, causing its teeth to engage the teeth of the gear 192. This engagement takes place when parts are in the position shown in Fig. 11. Here it will be noted that the subsequent rotation of the gear 71 causes the pin 201 to draw on the connecting rod 203 thus through the mechanism described actuating the gears 192 and 87 and revolving the spindle carrying head.

The partial revolution of the spindle carrying head starts very slowly, relatively speaking, and increases its speed until the movement is half completed and then decreases its speed coming gently to a stop in which position it is locked. This gradual starting and stopping is due to the fact that the motion delivered through the connecting rod 203 occurs through a half circle motion of the pin 201, beginning at a point where the direction of pull is substantially at right angles to the subsequent movement of the pin, and ending the same way, whereby the direct pull and rapid motion occurs at the mid point of this half circle motion. The velocities of the moving parts have characteristics corresponding to those of a harmonic motion. This is true in the case of either position of the pin, whether the spindle-head is being indexed one quarter or one half of its revolution, and obviously the arrangement is capable of adaptation of pin and connecting rod positions such, that the amounts of movement of the spindle carrying head may be varied corresponding to the number of spindles selected. That is to say, this indexing motion is equally well adapted for two, three, six or any larger number of spindles in the head.

*The work holding spindles and chucks.*—
The spindle comprises essentially tubular members 210 having enlargements at 211 fitting tapered adjustable bearings indicated at 212. Outside of these bearings the tubes 210 are provided with enlargements 214 having conical inside surfaces 215 into which fit complementary surfaces of chuck heads 218 integral with tubes 220 fitting inside of the tubes 210. Heads 218 are provided with suitable jaws, such for example as cylindrical gripping surfaces 219, and the tube is shown as split for a considerable distance inside of the head 214, as indicated at 222, whereby longitudinal movement of the tube 220, within the sleeve 210, may allow the gripping jaws to spread or to cause them to contract into engagement with the work. The tube 220 is threaded at its inner end at an enlargement designated 224 to receive threads on a tube 225 slidably fitting the interior of the tube 210 and extending outwardly at the rear (or left hand end thereof Fig. 7). A spring indicated as 226, surrounding the end of the tube 225, acts in compression against a shoulder in the tube 210 and against the enlargement 224 of the chuck section 220 to urge the gripping jaws outwardly from the head 214.

To withdraw the tubes 225 and 220 with the gripping jaws, I have shown levers 230, pivoted at 231 between suitable ears formed on an internally threaded ring 232 embracing threads on the end of the tube 210 whereby it is rigid with said tube. The inner ends of the levers 230 are adapted to extend over a cam collar 235 provided with separated parallel flanges 236, arranged to be engaged by a cam indicated at 240 (Fig. 4), to slide these cam collars into and out of engagement with the levers 230. The opposite ends of the levers 230 engage abruptly tapered surfaces 237, on collars 238 slidable on sleeves 239 and rotatably embracing the sleeve 225 and held against outward movement by a suitable nut 245. Threaded onto the collar 239 is shown a nut 246 while a compensating spring 247 acts against this nut 246 and the collar 238, holding the collar 238 normally in the position shown in Fig. 7. By such a spindle arrangement the gripping pressure of the chucks is not affected by limited variations in the diameter of that part of the work which is gripped by the chucks.

Lock nut collars, indicated at 233 on the sleeves 210, serve to position the gears 76 which are rigid with this sleeve, and also to prevent longitudinal movement of the sleeve 210 in one direction, while the adjustable bearings 212 are provided with suitable shoulders preventing movement in the opposite direction, whereby during the rotation of the spindles they are accurately held against axial shifting. The gears 76 are positioned between the collars 233 and adjustable bearings indicated at 234. The cam collars 235 are shifted by the cam or arcuate rib 240, which is formed on a bracket 242 depending from a slide 250 carried in ways parallel with the axes of the spindles and formed in the top of the housing 8.

To shift the slide 250 and correspondingly move two cam collars at the same time, thus opening or closing the chucks of two spindles at once, I have provided mechanism for automatically accomplishing this movement during the operation of the machine. Associated with this mechanism is means for manual operation when desired. Arising from the slide 250 is a loose motion pivot connection indicated at 252 (Fig. 8) with an arm 253 of a lever, pivoted at 254 and having a lever arm 255 connected by a pin 256 with a rock arm 257, rigid with a hub 258 on a vertical rock shaft 259, carried in suitable bearings integral with the parts of the spindle head housing 8. At the upper end of this shaft 259 is a bearing 260 integral with the upper portion of the spindle head housing 8, while the lower end of the shaft 259 has its bearing in a suitable enlargement 261 on the support 7 of the bed frame 1. Beneath the bearing 261 I have shown a rock lever 263 carrying at its inner end a roller 264 adapted to fit the cam slot in the cam drum 105, which rotates with the cams 99—96 etc.

This cam slot is so arranged that during the milling operation on the two lower spindles, the lever arm 263 is swung, rocking the shaft 259 and arm 257, which acts through the lever arms 255 and 253 urging the slide 250 outwardly (to the left in Fig. 4). As the rib 240 normally stands in a position to be engaged by the flanges on the cam collars 235 it urges two of these cam collars outwardly or inwardly. It acts on the collars 235, first withdrawing these collars, opening the chucks of the spindles, allowing the removal of the finished pieces and replacement by fresh pieces of work, after which the continued movement of the cams acts, through the connections described, to return the collars 235, again spreading the levers 230, drawing on the sleeve 225 and chuck jaws to cause them to contract onto the work.

*Means for locking spindle head.*—In the periphery of the disk 81, (Fig. 8) are sockets or notches spaced 90° apart as indicated at 270, adapted to receive the ends of a locking plunger 272 mounted to move radially in a suitable position indicated at 273. This plunger is preferably angular and is connected at its outer end to an actuating lever 275, shown as pivoted at 276 to a suitable bracket, extending outwardly from the bed frame, and as having an arm 277 extending inwardly toward the cam shafts and connected with a yoke 280. This yoke is provided with rollers 281 and 282 on the opposite arms of the yoke and offset to bear upon the cams 107 and 109.

These two cams are so arranged that the yoke and its lever are intermittently moved to withdraw the locking plunger 272 permitting the rotation of the spindle carrying head (in the direction of the arrows in Fig. 8) and to return the plunger immediately upon the completion of the revolving movement of the spindle carrying head, whereby the head is firmly locked in the position during the operations on the work driven by the spindles. The inner end of the plunger may be beveled on its lower side, that is, the side toward which the sockets therefor approach, whereby the plunger may also function as a stop, and as it is thrust inwardly may wedge tightly into position, assuring the accurate positioning of the spindles with relation to the cutters and other operating parts of the machine.

The yoke 280 is shown as carried on the same pivot 276, as the lever 275, and is connected with the arm 277 by a device allowing relative movement and yet adapted to hold the parts in their normal relationship as shown in Fig. 8. This device comprises a plunger screw 285 with an eye on its inner end 286, carried by the arm 287. This screw extends through a laterally turned ear 287 on the yoke 280, and is provided at its outer end with lock nuts 288, whereby a spring 289 may act in compression to normally draw the arm 277 into alignment with the arm 280, while allowing the movement of the yoke independently of the arm 277 against the action of the spring. The purpose of this is to absorb the shock of forcing the plunger 272 into position, and also prevent possible breaking of parts in case of failure of the plunger to register accurately of the spindle head.

In the lower part of Fig. 8 is arranged an oil draining and pumping system for supplying cutting and flushing lubricant to the cutters during operation of the machine. This system may be of any standard construction. In the drawing I have shown pumps 290 mounted on the opposite sides of the bed frame, and provided with pulleys over which extend the belts 291 and 292, in turn running over a wide pulley 294, on the main driving shaft 56. These pumps are connected with intake pipes indicated at 296 and discharge pipes 295, which may be connected through any suitable system of piping or tubing leading the lubricant to the work. Such a lubricant system does not form a component part of this invention, and is sufficiently well-known in milling and cutting machines of this character as to require no further description.

Having thus described my invention I claim:

1. A milling machine comprising in combination, a base, a rotatable carrier head thereon, a plurality of work supporting spindles mounted in said carrier head, means to rotate each of said spindles, a milling cutter mounted adjacent one end of said spindles, means to advance said milling cutter into operative position, and means to relatively move said cutter and spindles in a direction parallel to said spindles in timed relation to the rotation thereof.

2. A milling machine comprising in combination, a base, a rotatable carrier head thereon, a plurality of work supporting spindles mounted in said carried head, means to rotate each of said spindles, a milling cutter mounted adjacent one end of said spindles, means to advance said milling cutter into operative position in directions parallel to and at right angles to the axis of said spindles, and means to relatively move said cutter and spindles in a direction parallel to said spindles in timed relation to the rotation thereof.

3. A milling machine comprising in combination, a base, a rotatable carrier head thereon, a plurality of work supporting spindles mounted in said carrier head, means to rotate each of said spindles, a milling cutter mounted adjacent one end of said spindles, automatic means to advance said milling cutter into operative position, and means to relatively move said cutter and spindles in a direction parallel to said spindles in timed relation to the rotation thereof.

4. A milling machine comprising in combination, a base, a rotatable carrier head thereon, a plurality of work supporting spindles mounted in said carrier head, means to rotate each of said spindles, a milling cutter mounted adjacent one end of said spindles, means to advance said milling cutter into operative position in directions parallel to and at right angles to the axis of the spindles, and automatic means to relatively move said cutter and spindles in a direction parallel to said spindles in timed relation to the rotation thereof.

5. A milling machine comprising in combination, a base, a rotatable carrier head thereon, a plurality of work supporting spindles mounted in said carrier head, means to rotate each of said spindles, a milling cutter mounted adjacent one end of said spindles, means to advance said milling cutter into operative position in directions parallel to and at right angles to the axis of the spindles, and means to relatively move said cutter and an operative spindle in a direction parallel to said spindles in timed relation to the rotation thereof, each of said means being automatically operated in a predetermined cycle.

6. A milling machine comprising in combination, a base, a rotatable carrier head thereon, means to index said carrier head, a plurality of work supporting spindles mounted in said carrier head, means to index said carrier head about an axis parallel to said spindles, means to rotate each of said spindles, a milling cutter mounted adjacent one end of said spindles, means to advance said milling cutter into operative position, and means to relatively move an operative spindle and cutter in a direction parallel to said spindles in timed relation to the rotation thereof.

7. A milling machine comprising in combination, a base, a rotatable carrier head thereon, a plurality of work supporting spindles mounted in said carrier head, means to rotate each of said spindles, a milling cutter mounted adjacent one end of said spindles, means to advance said milling cutter into operative position, means to relatively move an operative spindle and cutter in a direction parallel to said spindles in timed relation to the rotation thereof, and means to withdraw said cutter from operative position when said spindle has completed a predetermined rotation.

8. A milling machine comprising in combination, a base, a rotatable carrier head thereon, a plurality of parallelly disposed work supporting spindles mounted in said carrier head, means to rotate each of said spindles, means to index said carrier head about an axis parallel to said spindles, a milling cutter mounted adjacent one end of said spindles, means to advance said milling cutter into operative position, means to relatively move an operative spindle and cutter in a direction parallel to said spindle in timed relation to the rotation thereof, and means to withdraw said cutter from operative position when said spindle has completed a predetermined rotation.

9. A milling machine comprising in combination, a base, a rotatable carrier head thereon, a plurality of parallelly disposed work supporting spindles mounted in said carrier head, means to rotate each of said spindles, means to index said carrier head about an axis parallel to said spindles, a milling cutter mounted adjacent one end of said spindles, means to advance said milling cutter into operative position in directions parallel to and at right angles to the axis of said spindles, means to relatively move an operative spindle and cutter in a direction parallel to said spindle in timed relation to the rotation thereof, and means to withdraw said cutter from operative position in directions parallel to and at right angles to the axis of said spindles when said spindle has completed a predetermined rotation.

10. A milling machine comprising in combination, a base, a rotatable carrier head thereon, a plurality of work supporting spindles mounted in said carrier head, means to rotate each of said spindles, a milling cutter mounted adjacent one end of said spindles, a pair of slides for said milling cutter, one of said slides being movable longitudinally to said spindle axes and the other slide movable upon said first slide in a direction normal to said spindle axes, and means to relatively move said first mentioned slide and said work spindles in timed relation to the rotation of said work spindle and in timed relation to the indexing movements of said carrier head.

11. A milling machine comprising in combination, a base, a rotatable carrier head thereon, a plurality of parallelly disposed work supporting spindles mounted in said carrier head parallelly with the axis of rotation thereof, means to rotate each of said spindles, a milling cutter mounted adjacent one end of said spindles with its axis parallel to the axes of said spindles, and means to relatively move said cutter and work spindles in a direction parallel to said spindles in timed relation to the rotation thereof.

12. A milling machine comprising in combination, a base, a rotatable carrier head thereon, a plurality of work supporting spindles mounted in said carrier head parallelly disposed relative to the axis of rotation thereof, means to index said carrier head to move each spindle into operative position, means to rotate each of said spindles, a milling cutter mounted adjacent the operative position of said spindles with its axis parallel to the axes of said spindles, and means to relatively move the cutter and spindles in a direction parallel to said spindle in timed relation to the rotation thereof.

13. A milling machine comprising in combination, a base, a plurality of work supporting spindles parallelly disposed relative to each other, means to rotate each of said spindles, a pair of milling cutters independently adjustable along the base mounted on cooperating slides adjacent the operative position of said spindles with the axes of said cutters disposed parallelly to the axes of said spindles, and means to relatively move the cutters and spindles in a direction parallel to said spindle in timed relation to the rotation thereof.

14. A milling machine comprising in combination, a base, a rotatable carrier head thereon, a plurality of work supporting spindles mounted in said carrier head and parallelly disposed relative to the axis of rotation thereof, means to index said carrier head to move each spindle into an operative position, means to rotate each of said spindles, a pair of milling cutters independently adjustable along the base mounted on cooperating slides adjacent the operative position of said spindles with the axes of said cutters disposed parallelly to the axes of said spindles, and means to relatively move the cutters and spindles in a direction parallel to said spindle in timed relation to the rotation thereof.

15. A milling machine comprising in combination, a base, a rotatable carrier head thereon, a plurality of work supporting spindles mounted in said carrier head, means to rotate each of said spindles, two independently adjustable milling cutters mounted adjacent two of said work spindles, means to simultaneously advance said milling cutters into operative position, and means to relatively move said cutters and spindles in a direction parallel to said spindles in timed relation to the rotation thereof.

16. A milling machine comprising in combination, a base, a rotatable carrier head thereon, a plurality of work supporting spindles mounted in said carrier head, means to rotate each of said spindles, a pair of independently adjustable milling cutters mounted respectively upon co-operating slides adjacent the ends of two of said spindles, means to advance said milling cutters into operative position by movements parallel to the axis of said spindles and in a direction normal to the axis thereof, and means to simultaneously and relatively move said cutters and spindles in a direction parallel to said spindles in timed relation to the rotation thereof.

17. A milling machine comprising in combination, a base, a rotatable carrier head thereon, a plurality of work supporting spindles mounted in said carrier head, means to rotate each of said spindles, means to index said rotatable carrier head through a half revolution to present work spindles to operative positions, a pair of milling cutters mounted adjacent the ends of two of said spindles, means to preliminarily position said cutters along said base, means to simultaneously advance said milling cutters into operative position, and means to move said cutters in a direction parallel to said spindles in timed relation to the rotation thereof.

18. In a milling machine, the combination of a base, a rotatable carrier head thereon, a plurality of work supporting spindles mounted in said carrier head parallel with the axis of rotation of said carrier head, means to rotate each of said spindles, a milling cutter mounted adjacent the operative positions of said spindles with its axis parallel to the axes of said spindles, cam operated means to relatively move said work spindle and cutter in a direction parallel to said spindle in timed relation to the rotation thereof, and means to move said cutter into and out of work engaging position.

19. In a milling machine, the combination of a base, a rotatable carrier head thereon, a plurality of work supporting spindles mounted in said carrier head parallel with the axis of rotation of said carrier head, means to rotate each of said spindles, a pair of milling cutters mounted adjacent the operative positions of said spindles with their axes parallel to the axes of said spindles, cam operated means to relatively move said work spindle and cutters in a direction parallel to said spindle in timed relation to the rotation thereof, and means to simultaneously move said cutters into and out of work engaging position.

20. In a milling machine, the combination of a base, a rotatable carrier head thereon, a plurality of rotatable work spindles in said carrier head, rotatable spindles for a pair of milling cutters, means for effecting relative movement to bring about working relationship between the cutters and a pair of work spindles successively, means for rotating the work spindles when in operative position relative to the cutters, and means to index said spindles to engage successive pairs of spindles with said cutters during each cycle of operations.

21. In a milling machine, the combination of a rotatable carrier head, a plurality of work spindles therein positioned at equal distances from the carrier head axis, a rotatable spindle for a milling cutter, means for indexing the carrier head to bring the work spindles successively into operative relation with the cutter, and means for rotating each spindle through approximately one revolution while in said operative position, and means for actuating the index mechanism to index said rotatable carrier head through one half a revolution at each cycle of operations.

22. In a milling machine, the combination of a rotatable carrier head, a plurality of work spindles therein positioned at equal distances from the carrier head axis, a plurality of milling cutters adjacent operative positions of said spindles, means for indexing the carrier head to bring pairs of work spindles alternately into operative and inoperative relationship with said cutters, and means for rotating each spindle through more than one revolution while in operative relationship with said cutters.

23. In a milling machine, the combination of a rotatable carrier head, a plurality of work spindles therein parallelly disposed and positioned at equal distances from the carrier head axis, a plurality of milling cutters disposed parallelly to said work spindles and adjacent operative positions of said spindles, means for indexing the carrier head to bring pairs of work spindles alternately into operative and inoperative relationship with said cutters, and means for rotating each spindle through more than one revolution while in operative relationship with the cutters.

24. In a milling machine, the combination of a rotatable carrier head, a plurality of work spindles therein parallelly disposed and positioned at equal distances from the carrier head axis, a plurality of milling cutters disposed parallelly to said work spindles and adjacent operative positions of said spindles, means for indexing the carrier head about an axis parallel to the axes of said work spindles to bring pairs of work spindles alternately into operative and inoperative relationship with said cutters, and means for rotating each spindle through more than one revolution while in operative relationship with the cutters.

25. In a milling machine, the combination of a rotatable carrier head, a plurality of work spindles in said carrier head parallel to and positioned at equal distances from the axis thereof, a rotatable spindle for a thread milling cutter, means for indexing the carrier head to bring the work spindles successively into relative relation with the cutter, means for relatively moving said cutter and work spindle axially of the operative work spindle in timed relation to each other, means to move said cutter into and out of operative relation with said cutter, and means for rotating each work spindle through more than one revolution while in said operative relation.

26. In a milling machine, the combination of a rotatable carrier head, a work spindle rotatably mounted therein, a rotatable spindle for a thread milling cutter, means for rotating the work spindle, means for effecting a relative longitudinal feeding movement between the work spindles and the cutter spindle during more than one revolution of the work spindle in timed relation to the rotation thereof, and independent means acting immediately after the feeding movement, one means to index the turret and the other means to quickly effect a longitudinal return movement of the cutter to its initial position.

27. In a milling machine, the combination of a rotatable carrier head, a work spindle therein parallel to the axis thereof, a rotatable spindle for a thread milling cutter, means for rotating the work spindle, a cam for effecting a relative longitudinal feeding movement between the work spindle and the cutter spindle during more than one revolution of the work spindle in timed relation to the rotation thereof, means to move said cutter spindle longitudinally of the axis of the work spindle and also at right angles thereto to position said cutter in operative relation with the work spindle, and independent means acting immediately after the feeding movement to index said carrier head and to quickly effect a relative longitudinal return movement of the cutter to its initial position.

28. A milling machine comprising in combination, a base, a rotatable carrier head thereon, a plurality of work supporting spindles mounted in said carrier head, an extension rotatable with said carrier head, centering heads on said extension adapted to support the outer ends of work in said spindles. means to rotate each of said spindles, a milling cutter mounted adjacent one end of said spindles, and means to relatively move said cutter and work spindle in a direction parallel to said spindles in timed relation to the rotation thereof.

29. A milling machine comprising in combination, a base, a rotatable carrier head thereon, a plurality of work supporting spindles mounted in said carrier head, an extension rotatable with said turret, centering heads on said extension in alignment with the work spindles adapted to support the outer ends of work mounted in each of said spindles, means to rotate each of said spindles, a milling cutter mounted adjacent one end of said spindles, and means to relatively move said cutter and work spindle in a direction parallel to said spindles in timed relation to the rotation thereof.

30. A milling machine comprising in combination, a base, a rotatable carrier head thereon, a plurality of work supporting spindles mounted in said carrier head, an extension in alignment with the axis of said carrier head, a plurality of independently adjustable centering heads on said extension, plungers in said centering heads to support the outer ends of work on said spindles, means to rotate each of said spindles when in operative position on said machine, a milling cutter mounted adjacent one end of said spindles, and means to relatively move said cutter and work spindles in a direction parallel to said spindles in timed relation to the rotation thereof.

31. A milling machine comprising in combination, a base, a rotatable carrier head thereon, a plurality of work supporting spindles rotatably mounted in said carrier head, a milling cutter mounted adjacent one end of said spindles, means to move said milling cutter into and out of operative position in a direction radially toward and from said spindles, means to move it in a direction parallel to said spindles, two cam shafts for operating said cutter moving means, and driving means for said spindles, said driving means being adapted to rotate said spindles more than one revolution while said cam shafts rotate one complete revolution.

32. A milling machine comprising in combination, a base, a rotatable carrier head thereon, a plurality of work supporting spindles rotatably mounted in said carrier head, a milling cutter mounted adjacent one end of said spindles, means to move said milling cutter radially toward and from said spindles into and out of operative relation therewith, means to move said cutter spindle in a direction parallel to said spindles, cam shafts for operating said cutter moving means, and means to rotate each of said spindles, said rotating means being adapted to rotate said spindles at a higher speed than said cam shafts.

33. A milling machine comprising in combination, a base, a rotatable carrier head thereon, a plurality of work supporting spindles rotatably mounted in said carrier head, a milling cutter mounted adjacent one end of said spindles, means to move said milling cutter radially into and out of operative position, means to relatively move said cutter and spindles in a direction parallel to said spindle in timed relation to the rotation thereof, cam shafts for operating both of said above mentioned means, means to rotate each of said spindles, said means being adapted to rotate said spindles more than one revolution during one revolution of said cam means.

34. A milling machine comprising in combination, a base, a rotatable carrier head thereon, a plurality of parallelly disposed work supporting spindles rotatably mounted in said carrier head, two independently adjustable milling cutters mounted adjacent one end of said spindles, means to move said milling cutters radially into and out of operative position and to move them in a direction parallel to said spindles, cam shafts for operating said cutter moving means, means to rotate each of said spindles, said spindles being rotated more than one revolution during one rotation of said cam shafts, and means to index said turret to successively advance pairs of work spindles to operative positions adjacent said cutters.

35. A milling machine comprising in combination, a base, a rotatable carrier head thereon, a plurality of parallel work supporting spindles disposed parallelly with the axis of rotation of said carrier head, a cutter support slidable on said base toward and from said spindle in a direction parallel to said spindle axis, a second slide mounted on said first slide and adapted to move transversely of said first slide, a cutter on said second slide, means to move said slides longitudinally along said base, and means to move said second slide a predetermined distance relative to said first slide, said slides being moved in timed relation to each other.

36. A milling machine comprising in combination, a base, a rotatable carrier head thereon, a plurality of parallel work supporting spindles disposed parallelly with the axis of rotation of said carrier head, a cutter support slidable on said carrier head toward and from said spindles in a direction parallel to the axis thereof, a second slide mounted on said first slide and adapted to move transversely of said first slide, a cutter on said second slide, cam operated means to move said slides longitudinally along said base, and cam operated means to move said second slide a predetermined radial distance relative to said first slide, said slides being moved in timed relation to each other.

37. A milling machine comprising in combination, a base, a rotatable carrier head thereon, a plurality of parallel work supporting spindles disposed parallelly with the axis of rotation of said carrier head, a cutter support slidable on said carrier head toward and from said spindles in a direction parallel to the axis thereof, a second slide mounted on said first slide and adapted to move transversely of said first slide, a cutter on said second slide, cam operated means to move said slides longitudinally along said base, cam operated means to move said second slide a predetermined radial distance relative to said first slide, said slides being moved in timed relation to each other, and adjusting means for positioning said cutter for different diameters of work.

38. In a machine of the character described, the combination of a plurality of work spindles, a cutter spindle, means for causing relative rotation of the cutter and work spindles, means for presenting work to the cutter spindle by a relative revoluble movement of the carrier head and work spindles, driving gearing and change speed gearing between said cutter spindle and said work spindles to vary the relative speed of rotation thereof, and means independent of the work and positively determining longitudinal movement between the cutter and work when in operative position.

39. In a machine of the character described, the combination of a carrier head carrying a plurality of work spindles, a cutter spindle, means for causing relative rotation of cutter and work spindles, means for presenting work to the cutter spindle by a relative revoluble movement of the carrier head and work spindles, shafts parallel to the cutter and work spindles for driving the cutter and work spindles, and an elongated cam parallel to the aforesaid shafts for imparting a movement of the cutter spindles transversely of the work spindles.

40. In a machine of the class described, the combination of a plurality of work spindles mounted on a head, a cutter spindle, means for causing relative rotation of the cutter and work spindles, means for presenting work to the cutter spindle by relative revoluble movement of the carrier head and work spindles, and means for moving the cutter and work spindles longitudinally while in operative relation to each other comprising a slide, a turn table thereon having a rectilinear cam, means for adjusting the inclination of the cam relative to the path of the slide, and a member extending into said cam and connected to the carrying head.

41. In a machine of the character described, the combination of a plurality of work spindles, a cutter spindle, means for causing relative rotation of cutter and work spindles, means for presenting work to the cutter spindle by a relative revoluble movement of the carrier head and work spindles, said means comprising a clutch and a cam for governing the action of the same, a crank motion for driving said clutch, and means for adjusting said motion to cause an equiangular movement of the carrier head.

42. In a machine of the character described, the combination of a plurality of work spindles, a cutter spindle, means for causing relative longitudinal movement of the work and cutter spindles, a slide parallel with the axes of said work spindles for imparting said longitudinal movement to the same, and means for adjusting the longitudinal movement of the carrier slide head and work spindles relative to the cutter spindles.

43. In a machine of the character described, the combination of a plurality of work spindles, means for presenting the work to the cutter spindles by a revoluble movement of the cutter spindles with relation to the work spindles, a carrier frame for said work spindles, a rigid extension parallel with the axes thereof, and means adjustable on said extension for supporting the work.

44. In a machine of the character described, the combination of a plurality of work spindles a revoluble frame in which the work spindles are mounted, a cutter spindle, a slide frame carrying said cutter spindle, means for revolving the work spindles to present the work to the cutter, said means including a device acting on the carrier frame and a device acting on the work spindle slide, one of said devices serving to progress the spindles with relation to the pitch of the thread being cut, the other of said devices acting to move the spindle to present the cutter to the work, and means for causing a relative transverse movement of said spindles.

45. In a machine of the character described the combination of a plurality of work spindles a revoluble carrier head in which the spindles are mounted, a cutter spindle, a slide on which the cutter spindle is mounted, means for driving all of said spindles to rotate them on their own axes, means for advancing these spindles with a relative longitudinal movement corresponding to the pitch of the thread being cut, means for producing a relative transverse motion and intermittently acting means for causing a greater longitudinal movement subsequent to a transverse movement for withdrawing the cutter from the work.

46. In a thread milling machine of the character described, the combination of a plurality of work carrying spindles, a revoluble carrier head therefor, means for advancing the carrier head by an even step by step movement to present the work to the cutter, means for moving said cutter longitudinally and transversely of the work carrying spindle, and means acting on said work spindle carrier for advancing said carrier longitudinally a distance which corresponds to the pitch of the thread being cut.

47. In a thread milling machine of the character described, the combination of a plurality of work spindles, means for revolving the work carrier spindle upon its own axis, a multiple thread cutter, a cutter spindle therefor, a movable slide on which said cutter spindle is carried, means for revolving all of said spindles on their own axes, means for moving said spindles longitudinally a distance corresponding to the pitch of the thread being cut and means acting on said cutter carrying slides to move them a material distance intermittently, whereby the cutter may be presented to an inside surface of the work.

48. In a machine of the character described, the combination of a plurality of work spindles, a cutter spindle, means for supporting the cutter spindles and work spindles, means acting thereon to cause a relative revolving movement of the cutter and work spindles, and means for presenting the cutters to the work longitudinally with relation to the work spindles, said means comprising a member acting intermittently to move the cutter, and an additional means for relatively moving the cutter spindles and the work spindle a distance corresponding to the thread being cut.

49. In a machine of the character described, the combination of a plurality of work carrying spindles, rotatable on their own axes, a revoluble carrier head for such spindles, a cutter spindle, and a cutter carried thereby, and means for supporting the same and for moving the same toward and away from the carrier head, a slide on which the cutter spindle is mounted, a cam rotatable on an axis parallel with the axis of the work spindles, a connection between said cam and said slide for causing a relative longitudinal movement of the cutter intermittently with relation to the work spindle.

50. In a machine of the character described, the combination of a plurality of work carrying spindles, a cutter spindle, a slide on which the cutter spindle is mounted, a cam, a connection between said slide and said cam for causing a relative longitudinal movement of the spindles, means for causing a relative transverse movement of the work and cutter spindles, and means acting on the work spindles to intermittently advance them and withdraw them longitudinally on their own axis, and means for moving the cutter slide including an adjustable slide permitting the cutter to be positioned to vary its distance with relation to the center of the work spindle.

51. In a machine of the character described, the combination of a plurality of work spindles, a cutter spindle, means for revolving the work spindles to present them successively to the cutter spindles, means carrying the cutter spindles and adjustable longitudinally with relation to the work spindles and means including a cam and a slide and an adjustable connection for intermittently moving the cutter spindle with relation to the work spindle.

52. In a machine of the character described, a plurality of work spindles, a carrier head therefor, a frame member surrounding said carrier head, a cutter spindle, a slide on which the cutter spindle is mounted, said slide being mounted on said frame member, means for causing relative longitudinal and transverse movement of the cutter and work spindles for presenting work to the cutters and for advancing the cutter with relation to the pitch of the thread to be cut, the means for causing the advancement with relation to the work spindles to form the thread comprising a pair of cross slides, one of which is movable transversely of the other and at an angle with relation thereto slightly more or less than a right angle.

53. In a thread milling machine, the combination of a plurality of work carrying spindles, a carrier head therefor, a cutter spindle, means for causing a relative longitudinal and transverse movement of the cutter and work carrying spindles, said means including a slide movable transversely with relation to the axes of the thread cutter spindles and carrying cam surfaces, a slide movable longitudinally with relation to the cutter spindles and having a pivoted block engaged by said cam surfaces.

54. The combination of a plurality of work spindles, a carrier head therefor, a frame member surrounding said carrier head, a cutter spindle, means for causing relative longitudinal and transverse movement of the cutter and work spindles for presenting work to the cutters and for advancing the cutter with relation to the pitch of the thread being cut, and means for causing said advancement with relation to the thread and comprising a pair of cross slides, one of which is movable transversely of the other, and a slide carrying the cutter spindle and movable transversely with relation to the axes of the work spindles.

55. In a machine of the character described, the combination of a carrier head with work spindles carried thereby, a cutter spindle to which the work is presented by the movement of the carrier head, means for moving the work spindles longitudinally with relation to the cutter spindles, said means comprising a slide movable transversely of the axis of said spindles, and a connection between said slide and said carrier head for causing the longitudinal shifting thereof, while permitting the transverse movement thereof.

56. In a machine of the character described, the combination of a work spindle, a cutter spindle, a revoluble carrier head for the work spindle, means for shifting the carrier head longitudinally with relation to the axis of the work spindle, said means comprising a transversely movable slide, having a revoluble connection with relation to the work spindle, and means for moving said slide including a gear for movement in one direction.

57. In a machine of the character described, the combination of a work spindle, a cutter spindle, a revoluble carrier head for the work spindle, means for shifting the carrier head longitudinally with relation to the axis of the work spindle, said means comprising a transversely movable slide, having a revoluble connection with relation to the work spindle, and means for moving said slide including a gear for movement in one direction and a cam for moving in the opposite direction.

58. In a machine of the character described, the combination of a revoluble carrier head, a work spindle carried thereby, a cutter spindle to which the work is presented by the revolution of said carrier head, a slide having a revoluble relation with said carrier head, a slide movable transversely of the first mentioned slide, a connection between the slides said connection including a cam surface on the second named slide, a gear for moving said slide in one direction for even definite movement of the carrier head corresponding to the pitch of the thread being cut and a cam for the quick return movement of said last mentioned slide.

59. In a machine of the character described, the combination of a revoluble carrier head, a work spindle carried thereby, a cutter spindle to which the work is presented by the revolution of said carrier head, a slide having a revoluble relation to said carrier head, a slide movable transversely of the first mentioned slide, a connection between them, said connection including a cam surface on the second named slide, a gear for moving said slide in one direction for even definite movement of the carrier head during the cutting of the thread, and a cam for causing quick return movement thereof.

60. In a machine of the character described, the combination of a work spindle, a cutter spindle, means for causing relative transverse movement thereof to present work to the cutter, means for causing a relative longitudinal movement including transverse slides, one of which carries a superimposed revoluble member having cam surfaces causing such advancement, said revoluble member being adjustable about its own axis to vary the amount of longitudinal shifting of the spindles.

61. In a machine of the character described, the combination of work spindle, a cutter spindle, means for causing relative transverse movement thereof to present work to the cutter, means for causing a relative longitudinal movement including transverse slides, one of which carries a superimposed revoluble member having cam surfaces causing such advancement of said revoluble member and being adjustable about its own axis to vary the amount of shifting of the spindles, and a screw adjustment connecting the revoluble member with the slide to vary the angle of the cam surfaces with relation to the axis of the spindles.

62. In a machine of the character described, the combination of a plurality of work spindles, a plurality of cutter spindles, means supporting the cutter spindles and the work spindles, means for causing relative revolving movement of the cutter and work spindles, means for rotating the cutter spindles, and means for causing simultaneous transverse movement of the cutter spindles.

63. In a machine of the character described, the combination of a plurality of work spindles, a plurality of cutter spindles, means supporting the cutter spindles and the work spindles, means for causing relative transverse movement of the cutter and work spindles by a simultaneous movement of the cutter spindles.

64. In a machine of the character described, the combination of a plurality of work spindles, a cutter spindle and a multiple thread cutter carried thereby adapted to be presented to the work by a step by step revoluble movement of the carrier head and work spindles, and means for causing simultaneous revoluble, rotatable and longitudinal movement of the work spindles with relation to the cutter spindle.

65. In a thread milling machine, the combination of a plurality of work spindles, a cutter spindle, means for revolving the work spindles to present them successively to the cutter, said means including a clutch, a cam for controlling the action of the same, and a crank connected with said clutch for oscillating one member of the clutch.

66. In a machine of the character described, the combination of a head carrying a plurality of work spindles, a cutter spindle, and means for causing relative intermittent revolving movement of the work and cutter spindles to present them successively to each other, said means including a crank periodically connected to said head.

67. In a thread milling machine, the combination of a plurality of work spindles, a carrier head therefor, a cutter spindle, means for indexing the spindles by a step by step equi-angular movement of the carrier head, said means including a crank and a link adjustable in length to vary the equi-angular movement of the spindle carrier head.

68. In a thread milling machine, the combination of a plurality of work spindles, a cutter spindle, and means for rotating the work spindles to present work to the cutter spindles, said means including a clutch, a crank member and a connecting rod member, said latter member having selective center distances for varying the indexing movement of the work spindles.

69. In a machine of the character described, the combination of a plurality of work spindles, a cutter spindle, means for revolving the work spindles to present them successively to the cutter spindles, means for causing intermittent longitudinal and transverse movement of the cutter spindles with relation to the work spindles, said latter means including a cam, a slide and an adjustable connection between the cutter cam, the surfaces of the cam being parallel to the axes of the work spindles to permit various positions of the last named parts resulting from the longitudinal movement.

70. In a thread milling machine, the combination of a plurality of work spindles, a cutter spindle parallel with the axes of the work spindles, and means for causing a simultaneous longitudinal and revoluble step by step movement of the work spindles with relation to the cutter spindle without reversing the rotation of rotating parts.

71. In a machine of the character described, the combination of a revoluble carrier head, a plurality of work spindles carried thereby, a cutter spindle parallel with the axis of the work spindles, means for causing a simultaneous longitudinal and revoluble step by step movement of the work spindles with relation to the cutter spindles including means for varying the relative revoluble movement.

72. In a machine of the character described, the combination of a rotatable carrier head, a plurality of work spindles carried thereby, a cutter spindle parallel with the axis of the work spindles, means for causing a simultaneous longitudinal and revoluble step by step movement of the work spindles with relation to the cutter spindles without reversing the direction of rotation of any shaft, and means for locking said carrier head between said step by step movements.

73. In a machine of the character described, the combination of a plurality of work spindles, a cutter spindle, means for revolving the work spindles to present them successively to the cutter spindles, means for causing longitudinal movement of the work spindles with relation to the cutter spindle, and means for accurately registering the work spindles with relation to the cutter spindle during the longitudinal movement of the work spindles.

74. In a machine of the character described, the combination of a plurality of work carrying spindles, a revoluble and longitudinally movable carrier head for such spindles, a cutter spindle, means for supporting the same and for moving it toward and away from the carrier head and longitudinally with relation to the spindles and means for locking said carrier head while permitting longitudinal movement thereof.

75. In a machine of the character described, the combination of a plurality of work carrying spindles, a revoluble and longitudinally movable carrier head therefor, a cutter spindle, means for supporting the same and for moving it toward and away from the carrier head and longitudinally with relation to the spindles, a locking element transversely movable with relation to the work spindles and a recess slidably receiving said element to permit longitudinal movement of the carrier head.

76. In a thread milling machine, the combination of a plurality of work carrying spindles, a carrier head therefor, means for indexing the carrier head, means for moving the carrier head longitudinally with relation to the axes of the work spindles, means for locking the carrier head while permitting said longitudinal movement, and means for rotating said work carrying spindles on their own axes at various predetermined speeds.

77. In a machine of the character described, the combination of a cutter spindle, a plurality of work carrying spindles revoluble to be presented to the cutter, and a device for locking said supporting means whereby said spindles are accurately registered to bring the axes of the work and cutter spindles into a plane radial with relation to the axis of revolution of the work spindles.

78. In a machine of the character described, the combination of a plurality of work carrying spindles, each rotatable on its own axis, a revoluble carrier head for such spindles, a cutter spindle, and means for supporting the same and for moving it toward and away from the carrier head and longitudinally with relation to the spindles, means for rotating the cutter spindles, means for engaging and disengaging the work in the work spindles, and adjustable means for supporting the work on an axis coincident with the axis of the work spindles.

79. In a machine of the character described, the combination of a plurality of work carrying spindles, a revoluble carrier head for such spindles, a cutter spindle and means for supporting the same and for moving it toward and away from the carrier head and longitudinally with relation to the spindles, means for rotating the cutter spindle, and means for indexing the carrier head whereby a very slow starting and stopping rotating movement is imparted to the spindle carrier head, said latter means being adjustable to cause step by step movements of the work spindles of different angular distances.

80. In a machine of the character described, the combination of a plurality of work carrying spindles, each rotatable on its own axis, a revoluble carrier head for such spindles, a cutter spindle and means for supporting the same, means for rotating the cutter spindles, and means for engaging and disengaging the work in the work spindles and adjustable means for supporting the work on axes coincident with the axes of the work spindles, said means comprising a longitudinal extension of the work spindle support and adjustable center rests mounted thereon.

81. In a machine of the character described, the combination of a plurality of work carrying spindles, each rotatable on its own axis, a revoluble carrier head for such spindles, a cutter spindle and means for supporting the same and for moving it toward and away from the carrier head, means for rotating the cutter spindles, means for indexing the carrier head, means for intermittently locking the carrier head, means for engaging and disengaging the work in the work spindles, and means for supporting the work on axes coincident with the work spindles' axes.

82. In a thread milling machine, the combination of a plurality of work spindles, a cutter spindle, means supporting the cutter spindle and work spindles, means for causing relative revolving movement of the cutter and work spindles, means for rotating each of the spindles, and intermittently acting means for locking and unlocking the work in the work spindles, said latter means including a slide movable longitudinally of the work spindles, and means for manually operating the same.

83. In a machine of the character described, the combination of a plurality of work carrying spindles, a revoluble carrier head for such spindles, a cutter spindle and means for supporting the same and for moving it toward and away from the carrier head, said supporting means including an adjustable member parallel to the axis of the cutter spindle and a cutter spindle bearing mounted thereon.

84. In a machine of the character described, the combination of a plurality of work carrying spindles, a revoluble carrier head for such spindles, a cutter spindle and means for supporting the same and for moving it toward and away from the carrier head, said supporting means including a bar and a cutter spindle bearing adjustable along the bar.

In testimony whereof, I hereunto affix my signature in the presence of a witness.

GEORGE T. TRUNDLE, Jr.

Witness:
Wm. W. Johnson.